United States Patent [19]
Wilber et al.
[11] 3,835,312
[45] Sept. 10, 1974

[54] RECOVERY CONTROL CIRCUIT FOR CENTRAL PROCESSOR OF DIGITAL COMMUNICATION SYSTEM

[75] Inventors: John A. Wilber, Elk Grove Village; Verner K. Rice, Wheaton; Rolfe E. Buhrke, La Grange Park, all of Ill.

[73] Assignee: GTE Automatic Electric Laboratories Incorporated, Northlake, Ill.

[22] Filed: Mar. 15, 1973

[21] Appl. No.: 341,427

[52] U.S. Cl. .......... 340/172.5
[51] Int. Cl. .......... G06f 11/00, G06f 15/00
[58] Field of Search .......... 340/172.5

[56] References Cited

UNITED STATES PATENTS

| | | | |
|---|---|---|---|
| 3,386,082 | 5/1968 | Stafford et al. | 340/172.5 |
| 3,409,877 | 11/1968 | Alterman et al. | 340/172.5 |
| 3,444,528 | 5/1969 | Lovell et al. | 340/172.5 |
| 3,562,716 | 2/1971 | Fontaine et al. | 340/172.5 |
| 3,623,014 | 11/1971 | Doelz et al. | 340/172.5 |
| 3,641,505 | 2/1972 | Artz | 340/172.5 |
| 3,711,835 | 1/1973 | Jaeger | 340/172.5 |

*Primary Examiner*—Harvey E. Springborn

[57] ABSTRACT

The central data processor of a digital communication system includes a recovery control circuit which is responsive to error levels in the central processor and initiates an internal timing cycle to generate signals used to initiate system recovery action.

16 Claims, 52 Drawing Figures

CENTRAL PROCESSOR FUNCTIONAL INTERFACE BLOCK DIAGRAM

DPC BLOCK DIAGRAM

INPUT OUTPUT CIRCUIT

CONFIGURATION CONTROL CIRCUIT

MAINTENANCE ACCESS CIRCUIT

NOTE (1) ONLY THE RCC IN THE ACTIVE CP CAN CAUSE A STATE TRANSITION (2) BOTH RCC WILL BE IN SAME STATE

DEFINITIONS:

RCSR – RCC STATE RESET
RPTAL – RECOVERY PROGRAM TIMER ACTIVE LEVEL.
RCPSL – RCC PRIMARY START LEVEL
RCSSL – RCC SECONDARY START LEVEL

FIG. 15

TIMING GENERATOR PULSE CHART

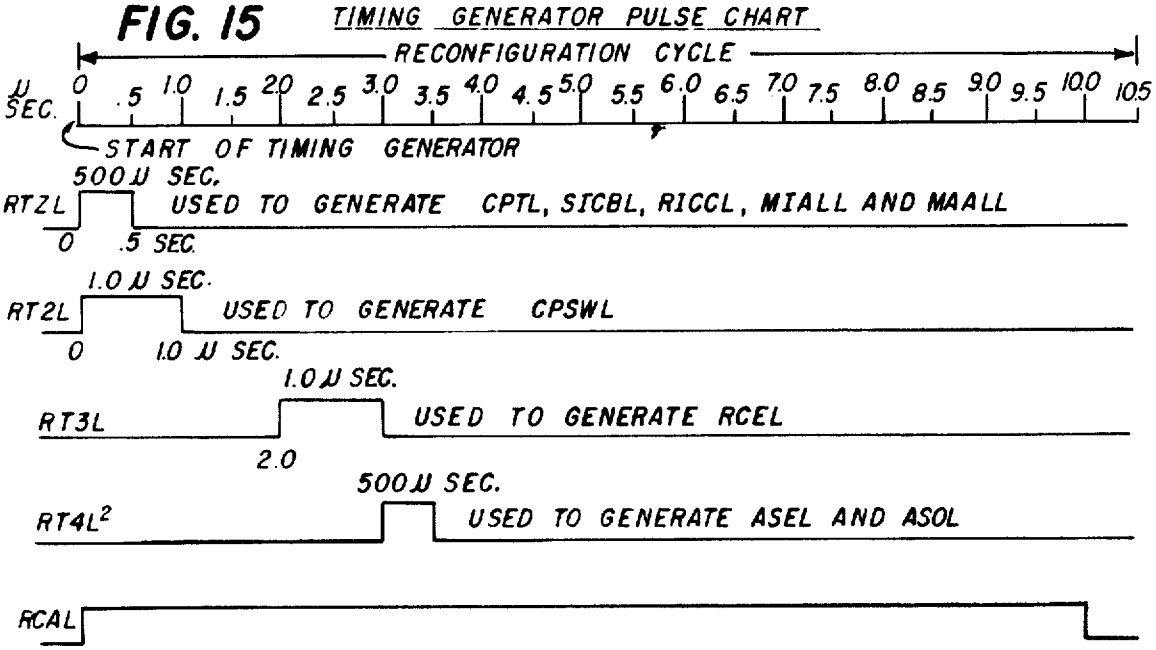

NOTE (1) RCC LOCKED OUT TO TRIGGERS FROM START OF CYCLE UNTIL END OF CYCLE (2) RT4L CAN OCCUR ANY TIME AFTER RT3L AND RT5L; NEW RCC STATE STARTS AT END OF RT4L

FIG. 16

STATE TRANSITION TABLE

| STATE | START LEVEL RCSSL | START LEVEL RCPSL | NEXT STATE | ERPTL | RCAL | MIALL | MAALL | RCEL | CPSWL | CPTL | SICBL | RICCL | ASEL | ASOL | FUNCTION |
|---|---|---|---|---|---|---|---|---|---|---|---|---|---|---|---|
| SΦ | X | | S1 | X | X | X | | | | | | | X | | PRIME RCC FOR CP SWITCH IN CASE RECOVERY PROGRAM INDICATES ACTIVE CP MALFUNCTION |
| SΦ | | X | S1 | X | X | X | | X | | | | | X | | START SRP |
| S1 | | X | S2 | X | X | | | X | X | | | | | X | SWITCH CP'S IF STANDBY IS NOT IN TROUBLE; START SRP |
| S2 | | X | S3 | X | X | | | | | | X | X | X | | IS1 BECOMES PRIMARY INSTRUCTION STORE START SRP |
| S3 | | X | S2 | X | X | | X | X | X | X | | X | | X | FORCE CP SWITCH; ISC BECOMES PRIMARY INSTRUCTION STORE START SRP |

FIG. 19

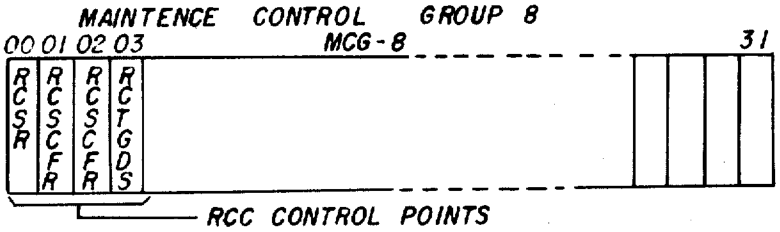

FIG. 20

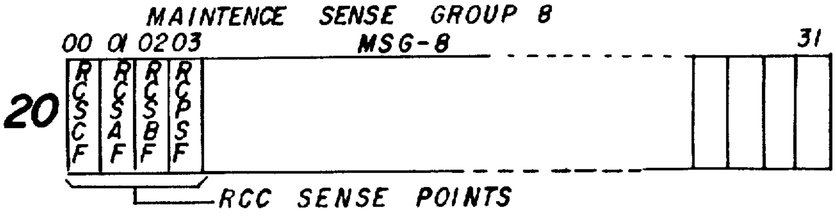

STATE TRANSITION TIMING DIAGRAM

| | STATE FLIP FLOP A | STATE FLIP FLOP B | STATE CONTROLS C | STATE CONTROLS RT4L |
|---|---|---|---|---|
| (SØ) | 0 | 0 | 0 | 0 |
| S1 | 0 | 0 | 1 | 1 |
| (S1) | 0 | 1 | 1 | 0 |
| S2 | 0 | 1 | 0 | 1 |
| (S2) | 1 | 1 | 0 | 0 |
| S3 | 1 | 1 | 1 | 1 |
| (S3) | 1 | 0 | 1 | 0 |
| S2 | 1 | 0 | 0 | 1 |
| (S2) | 1 | 1 | 0 | 0 |

FIG. 22

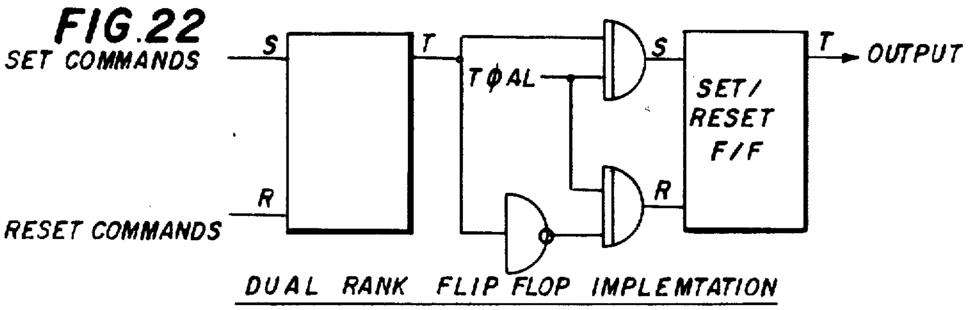

DUAL RANK FLIP FLOP IMPLEMTATION

FIG. 23

| I.S. BUS CONTROL F.F.'s C | B | T | D | INST ACT CP SEND | INST ACT CP REC | FETCH SBY CP SEND | FETCH SBY CP REC | DATA ACT CP SEND | DATA ACT CP REC | FETCH SBY CP SEND | FETCH SBY CP REC | IS CONFIGURATION |
|---|---|---|---|---|---|---|---|---|---|---|---|---|
| 0 | 0 | 0 | - | 0 | 0 | 1 | 1 | 0 | 0 | 1 | 1 | DUPLEX |
| 0 | 1 | 0 | - | 0/1 | 0/1 | - | 0/1 | 0/1 | 0/1 | - | 0/1 | MERGED |
| 0 | 0 | 1 | 0 | 0 | 0 | – | 0 | 0 | 0 | - | 0 | SIMPLEX |
| 0 | 0 | 1 | 1 | 0 | 0 | - | 0 | 1 | 1 | - | 1 | SIMPLEX-DIAGNOSTIC |
| 0 | 1 | 1 | 0 | 0/1 | 0 | - | 0 | 0/1 | 0 | - | 0 | SIMPLEX-UPDATE |
| 0 | 1 | 1 | 1 | 0/1 | 0 | – | 0 | 1/0 | 1 | – | 1 | SIMPLEX-UPDATE-DIAG. |
| 1 | 0 | 0 | - | 1 | 1 | 0 | 0 | 1 | 1 | 0 | 0 | DUPLEX |
| 1 | 1 | 0 | - | 1/0 | 1/0 | - | 1/0 | 1/0 | 1/0 | – | 1/0 | MERGED |
| 1 | 0 | 1 | 0 | 1 | 1 | - | 1 | 1 | 1 | - | 1 | SIMPLEX |
| 1 | 0 | 1 | 1 | 1 | 1 | – | 1 | 0 | 0 | – | 0 | SIMPLEX-DIAGNOSTIC |
| 1 | 1 | 1 | 0 | 1/0 | 1 | - | 1 | 1/0 | 1 | - | 1 | SIMPLEX-UPDATE |
| 1 | 1 | 1 | 1 | 1/0 | 1 | - | 1 | 0/1 | 0 | - | 0 | SIMPLEX-UPDATE-DIAG. |

IS BUS CONTROLS
AND RESULTING CONFIGURATIONS

FIG. 24

IS BUS CONTROL LEVEL EQUATIONS

DEFINITION OF TERMS:

| | | |
|---|---|---|
| C | - | ISCBF BUS CONTROL FLIP-FLOP OUTPUT |
| B | - | ISBBF BUS CONTROL FLIP-FLOP OUTPUT |
| T | - | ISTBF BUS CONTROL FLIP-FLOP OUTPUT |
| D | - | ISDBF BUS CONTROL FLIP-FLOP OUTPUT |
| DCPAL | - | DIAGNOSTIC CP ACTIVITY LEVEL (DCPAL = CPAL v DF) |
| DCCAF | - | DUAL CYCLE CONTROL A FLIP-FLOP (INPUT LEVEL FROM PCC) |
| SISBØL | - | SEND IS* BUS Ø LEVEL |
| SISB1L | - | SEND IS* BUS 1 LEVEL |
| RISBØL | - | RECEIVE IS* BUS Ø LEVEL |
| RISB1L | - | RECEIVE IS* BUS 1 LEVEL |
| XEC | - | EXECUTE INSTRUCTION |
| XECN | - | EXECUTE NON MEMORY INSTRUCTION |

SISBØL = $DCPAL\cdot\lceil B \vee \overline{C}\cdot(\overline{T} \vee \overline{D} \vee \overline{DCCAF} \vee XEC \vee XECN) \vee$
$C\cdot T\cdot D\cdot DCCAF\cdot\overline{XEC}\cdot\overline{XECN}\rceil \vee \overline{DCPAL}\cdot(C\cdot\overline{B}\cdot\overline{T})$ RISBØL = $DCPAL\cdot\lceil B\cdot\overline{T} \vee \overline{C}\cdot(\overline{T} \vee \overline{D} \vee \overline{DCCAF} \vee XEC \vee XECN) \vee$
$C\cdot T\cdot D\cdot DCCAF\cdot\overline{XEC}\cdot\overline{XECN}\rceil \vee$
$\overline{DCPAL}\cdot[B\cdot\overline{T} \vee \overline{C}\cdot T\cdot(\overline{D} \vee \overline{DCCAF} \vee XEC \vee XECN) \vee$
$C\cdot(\overline{T} \vee D\ DCCAF\cdot\overline{XEC}\cdot\overline{XECN})\rceil$ SISB1L = $DCPAL\cdot\lceil B \vee C\cdot(\overline{T} \vee \overline{D} \vee \overline{DCCAF} \vee XEC \vee XECN) \vee$
$\overline{C}\cdot T\cdot D\cdot DCCAF\cdot\overline{XEC}\cdot\overline{XECN}\rceil \vee \overline{DCPAL}\cdot(\overline{C}\cdot\overline{B}\cdot\overline{T})$ RISB1L = $DCPAL\cdot\lceil B\cdot T \vee C\cdot(\overline{T} \vee \overline{D} \vee \overline{DCCAF} \vee XEC \vee XECN) \vee$
$\overline{C}\cdot T\cdot D\cdot DCCAF\cdot\overline{XEC}\cdot\overline{XECN}\rceil \vee$
$\overline{DCPAL}\cdot\lceil B\cdot\overline{T} \vee C\cdot T\cdot(\overline{D} \vee \overline{DCCAF} \vee XEC \vee XECN) \vee$
$\overline{C}\cdot(\overline{T} \vee D\cdot DCCAF\cdot\overline{XEC}\cdot\overline{XECN})\rceil$

FIG. 41

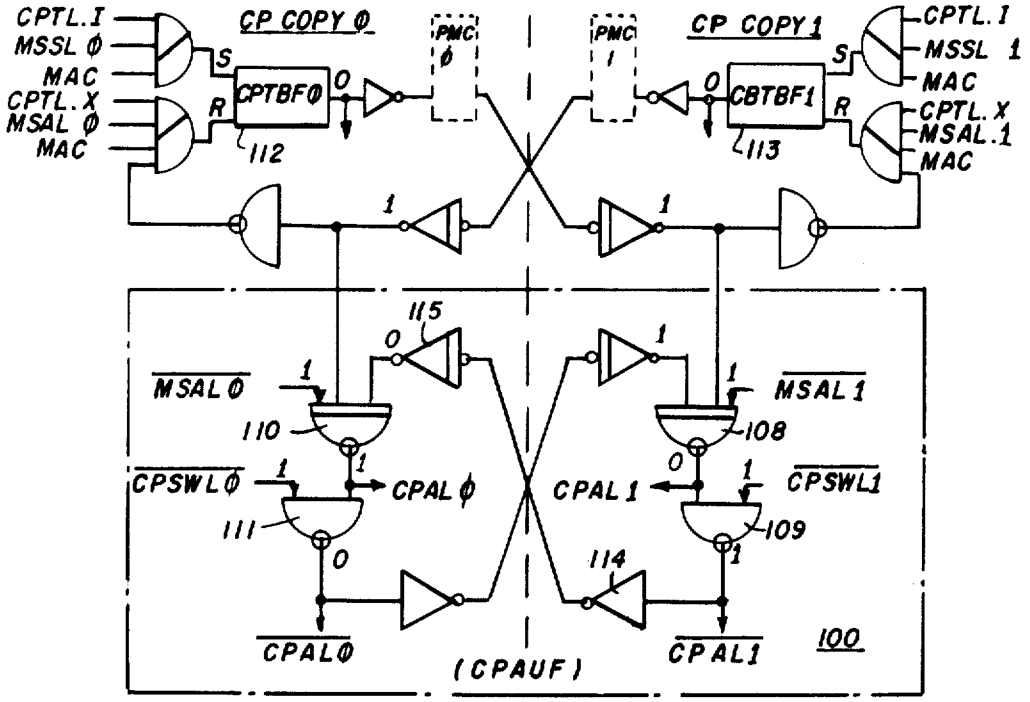

FIG. 42

ACTIVE AND STANDBY CP COPY —
SWITCHING AND NON-SWITCHING SEQUENCES

SWITCHING

ASSUME: CP COPY Ø = ACTIVE
CP COPY 1 = STANDBY
$\overline{\text{CPTBF 1}}$ = RESET (0)
$\overline{\text{CPSWL Ø}}$ BECOMES 0

T →

| | 0 | 1 | 2 | 3 | 4 | 5 | 6 |
|---|---|---|---|---|---|---|---|
| CPAL Ø | 1 | 1 | 1 | 1 | 1→ | 0 | 0 |
| $\overline{\text{CPAL Ø}}$ | 0 | 0→ | 1 | 1 | 1 | 1 | 1 |
| CPAL 1 | 0 | 0 | 0→ | 1 | 1 | 1 | 1 |
| $\overline{\text{CPAL 1}}$ | 1 | 1 | 1 | 1→ | 0 | 0 | 0 |
| $\overline{\text{CPSWL Ø}}$ | 1→ | 0 | 0 | 0 | 0 | 0→ | 1 |

NON SWITCHING

ASSUME: CP COPY Ø = ACTIVE
CP COPY 1 = STANDBY
$\overline{\text{CPTBF 1}}$ = SET (1)
$\overline{\text{CPSWL Ø}}$ BECOMES 0

| | 0 | 1 | 2 | 3 | 4 | 5 | 6 | 7 | 8 | 9 |
|---|---|---|---|---|---|---|---|---|---|---|
| CPAL Ø | 1 | 1 | 1 | 1 | 1 | 1 | 1 | 1 | 1 | 1 |
| $\overline{\text{CPAL Ø}}$ | 0 | 0→ | 1 | 1 | 1 | 1 | 1→ | 0 | 0 | 0 |
| CPAL 1 | 0 | 0 | 0→ | 1 | 1 | 1 | 1 | 1→ | 0 | 0 |
| $\overline{\text{CPAL 1}}$ | 1 | 1 | 1 | 1→ | 0 | 0 | 0 | 0 | 0→ | 1 |
| $\overline{\text{CPSWL Ø}}$ | 1→ | 0 | 0 | 0 | 0 | 0→ | 1 | 1 | 1 | 1 |

IO C GATING FOR IS RETURN BUSES

INTERFACE CP0 - IS0 BS

INTERFACE IS (CN).BS - IS (CN).UN

INSTRUCTION AND PROCESS STORE DATA BUS UNDER FOLLOWING CONDITIONS:

OPERATIONAL PULSE — WRITE
MODE PULSE — CONTROL
ADDRESS — MOD 8 = 5
UNIT SELECT — PS (CN). UN = 1

INSTRUCTION AND PROCESS STORE DATA BUS UNDER FOLLOWING CONDITIONS:

OPERATION PULSE — WRITE
MODE PULSE — CONTROL
ADDRESS — MOD 8 = 3.5
UNIT SELECT — PS (CN). UN = 1

RECOVERY CONTROL CIRCUIT FOR CENTRAL PROCESSOR OF DIGITAL COMMUNICATION SYSTEM

BACKGROUND AND SUMMARY

The present invention relates to a data processing system for use in connection with a digital communication system; and more particularly, it relates to such systems having duplicate copies of central processors and instruction storage means for obtaining higher reliiability, and wherein circuits are provided, upon the detection of a fault in one of these units, for reconfiguring the combination so as to provide an active copy of central processor and primary instruction store which is operative and capable of performing the required functions.

The invention will be described in connection with a particular system as disclosed in copending, co-owned applications of Brenski, et al., entitled "Control Complex for TSPS Telephone System," Ser. No. 289,718, filed Sept. 15, 1972, and Schulte, et al., entitled "Maintenance Access Circuit for Central Processor of Digital Communication System," filed Jan. 2, 1973, Ser. No. 320,020. The subject matter of these applications are incorporated herein by reference.

In brief, the present invention deals with recovery control circuitry which monitors malfunction detection circuits which cause system recovery program interrupts. The detection inputs to the recovery control circuit (RCC) are produced either by timing generation check circuitry in the timing monitor circuit, error levels detected in the data processing circuit, or by the recovery program timer or an active unit change detected by the timing generator circuit, or under program direction by a specific instruction executed by the processor control circuit, called a HELP instruction.

Only the RCC in the active central processor accepts triggers or inputs, and initiates system recovery action. The RCC in the standby central processor is kept in synchronism with the active RCC but cannot bring about independent change.

When an input or "trigger" is received at the active RCC, it executes a wired-logic reconfiguration program and then requests the interrupt control circuit to execute a system recovery program interrupt which causes the system to enter into a system recovery program designed to isolate the fault. If the system recovery program cannot be completed (i.e., the configuration currently including the active central processor and primary instruction store is not operable), another RCC trigger occurs.

Each consecutive RCC trigger causes the recovery control circuit to force one of the four combinations of central processor and instruction store. When an operative combination or configuration is found, the system recovery program completes the recovery and reconfiguration process without further intervention by the recovery control circuit.

The configuration control circuit responds to the switch signals generated by the recovery control circuit as it reconfigures the CP/IS configuration; and the input/output circuit brings about a change in primary instruction store, when directed by switching to the indicated instruction store bus system.

THE DRAWING

FIG. 15 is a timing chart for the timing cycle of the RCC;

FIG. 16 is a state transition table illustrating the various signals generated by the RCC as it undergoes state transition;

Figure 21:
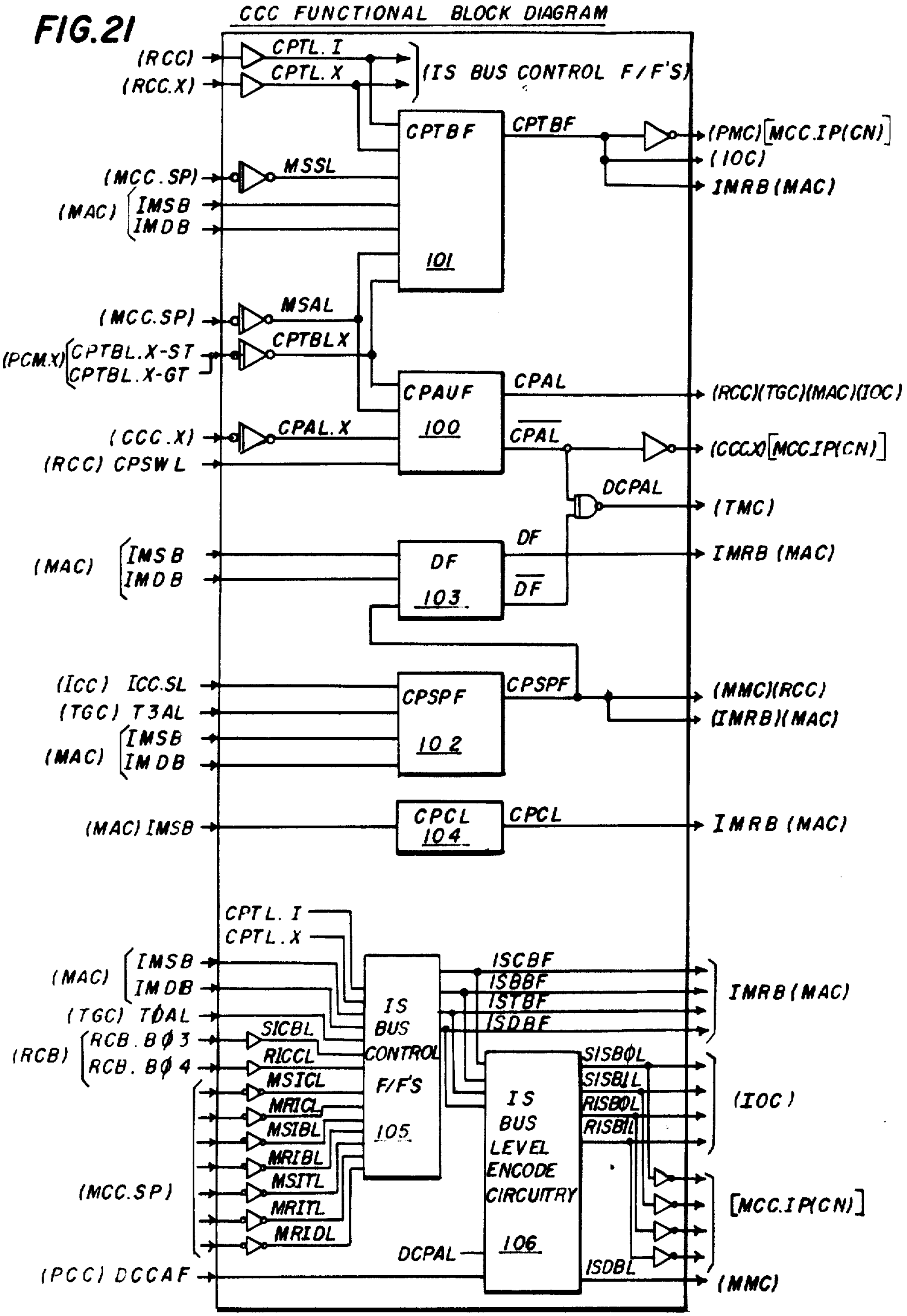
Figure 25:
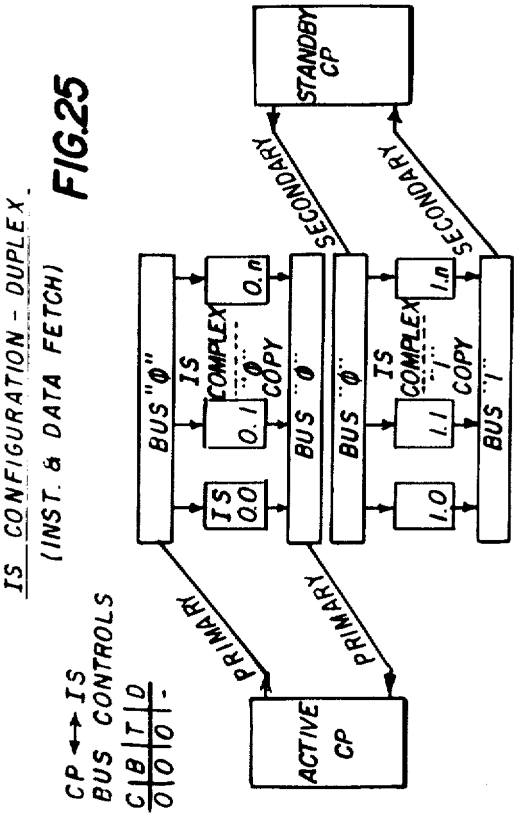
Figure 26:
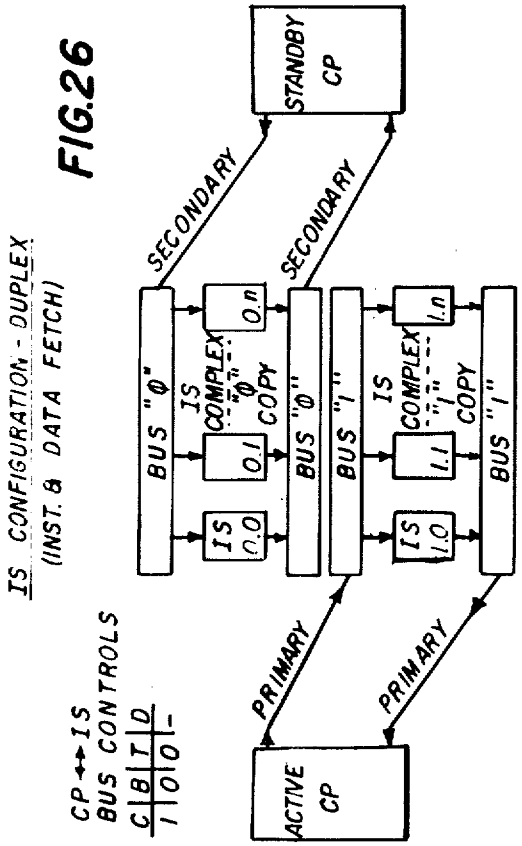
Figure 27:
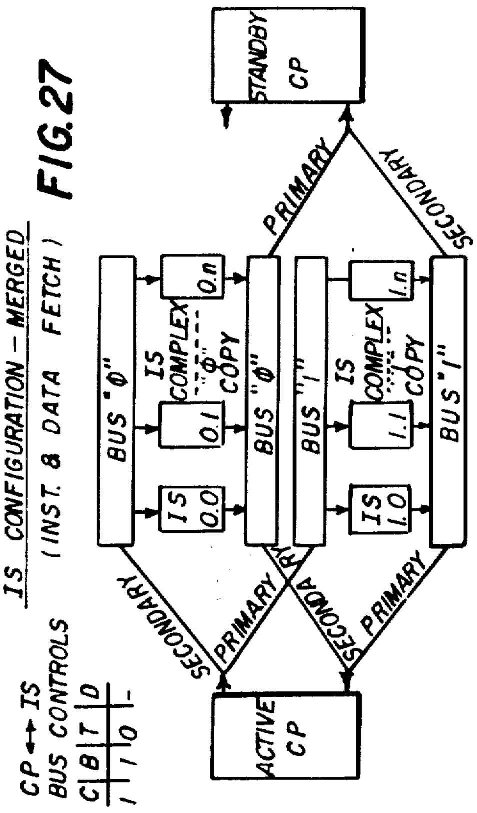
Figure 28:
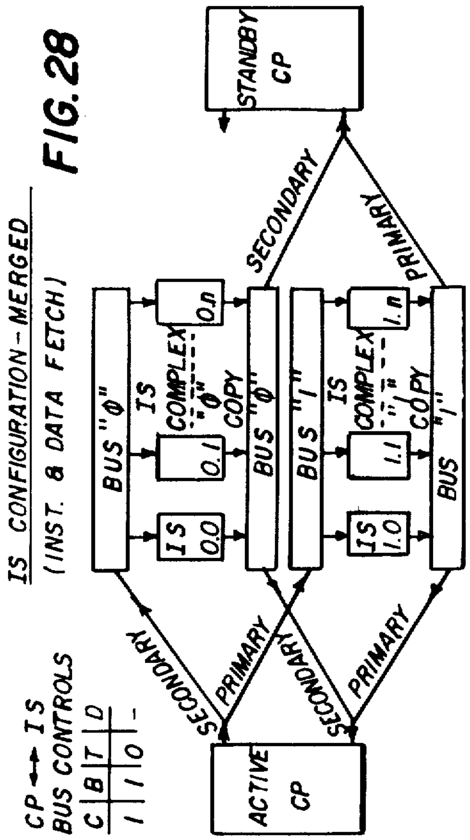
Figure 29:
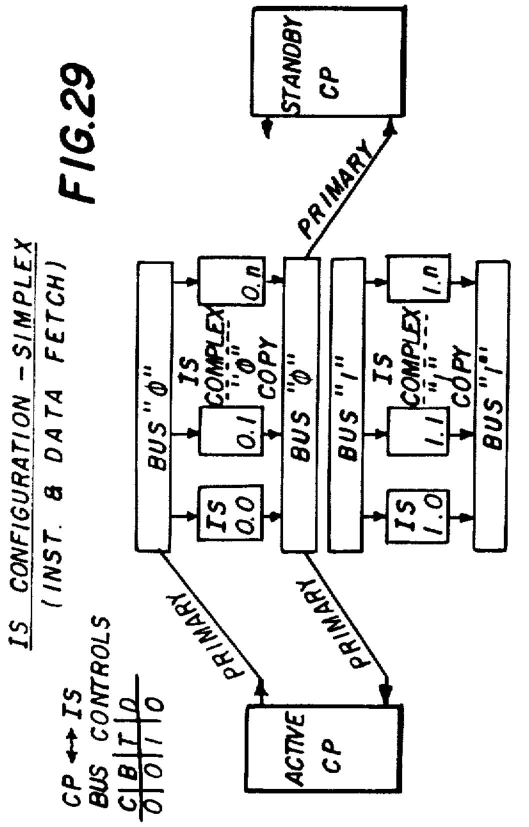
Figure 30:
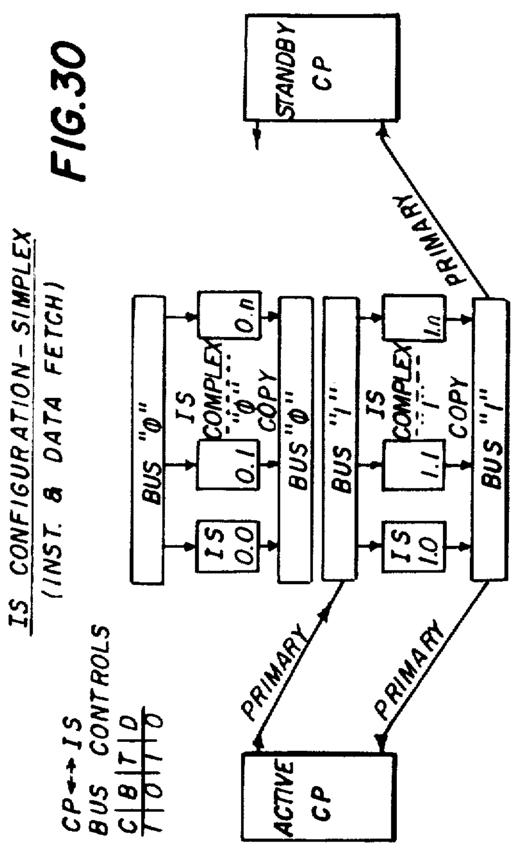
Figure 31:
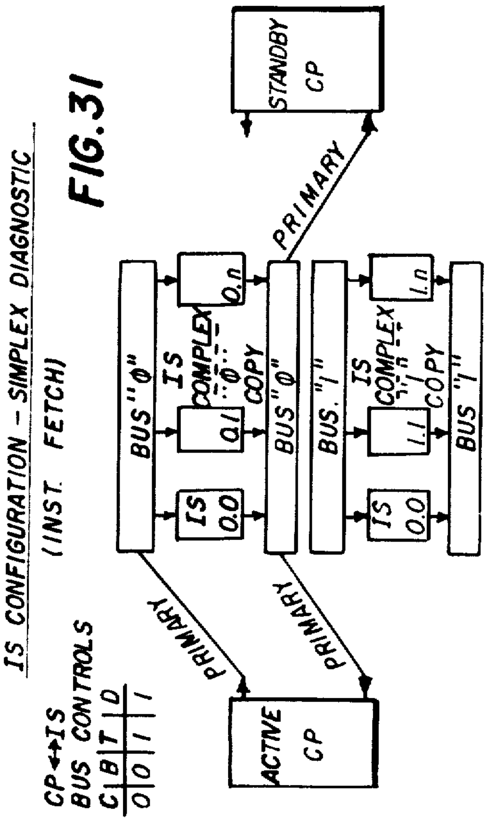
Figure 32:
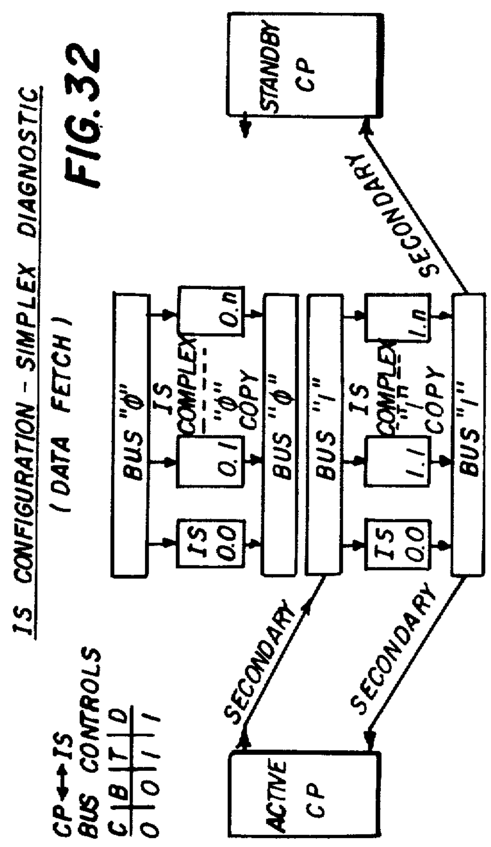
Figure 34:
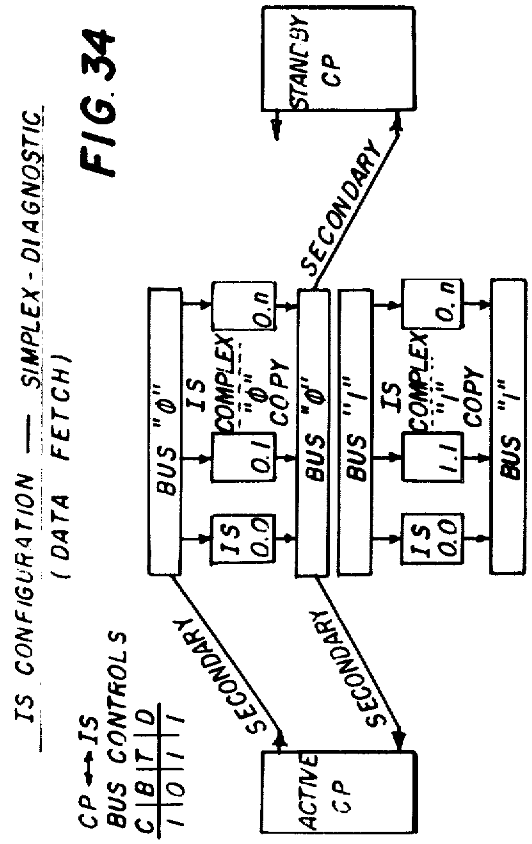
Figure 33:
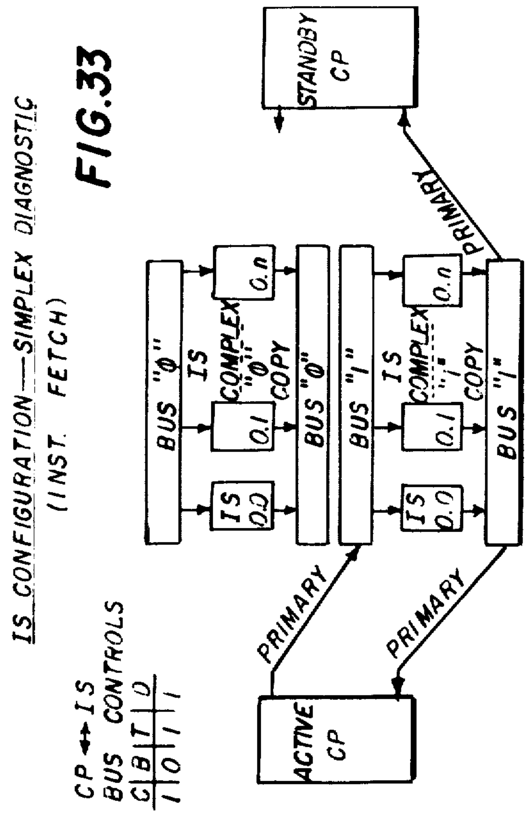
Figure 36:
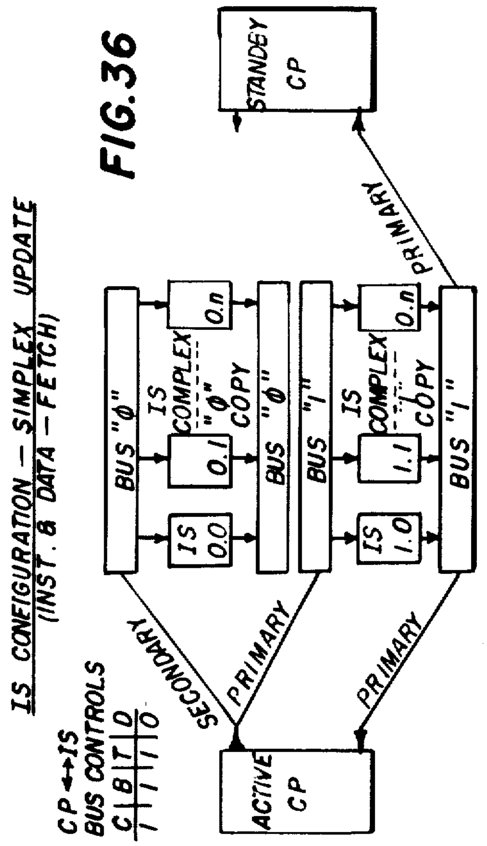
Figure 35:
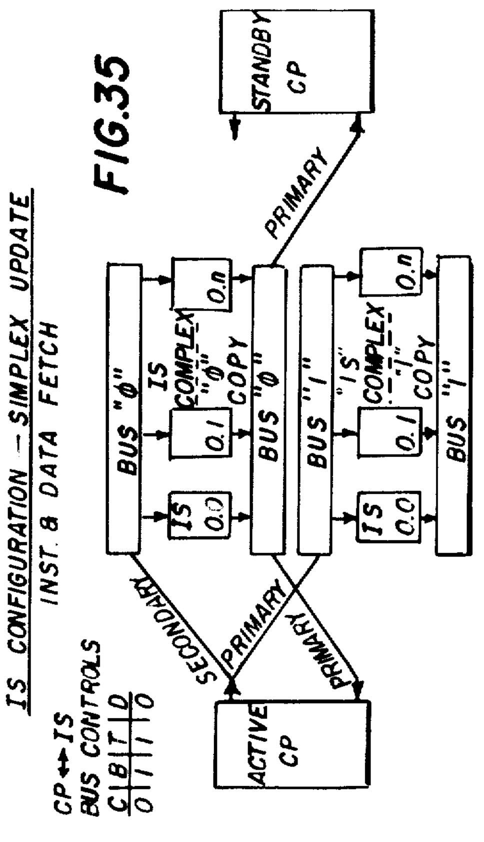
Figure 37:
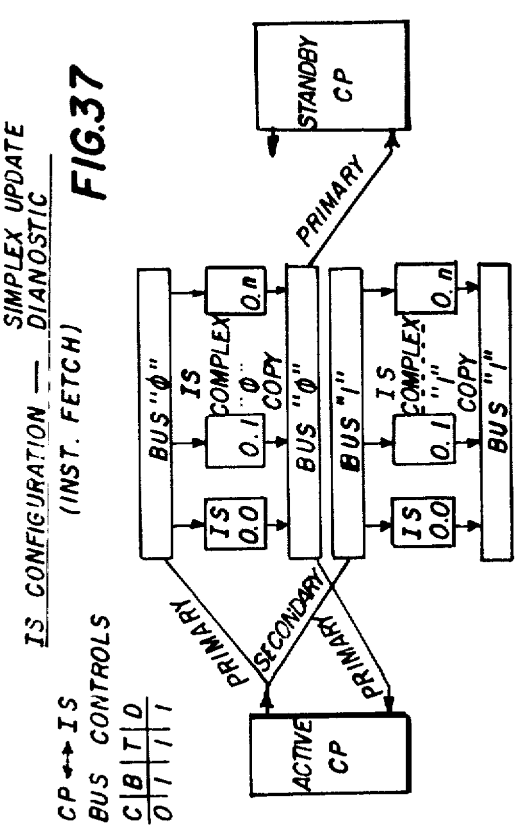
Figure 38:
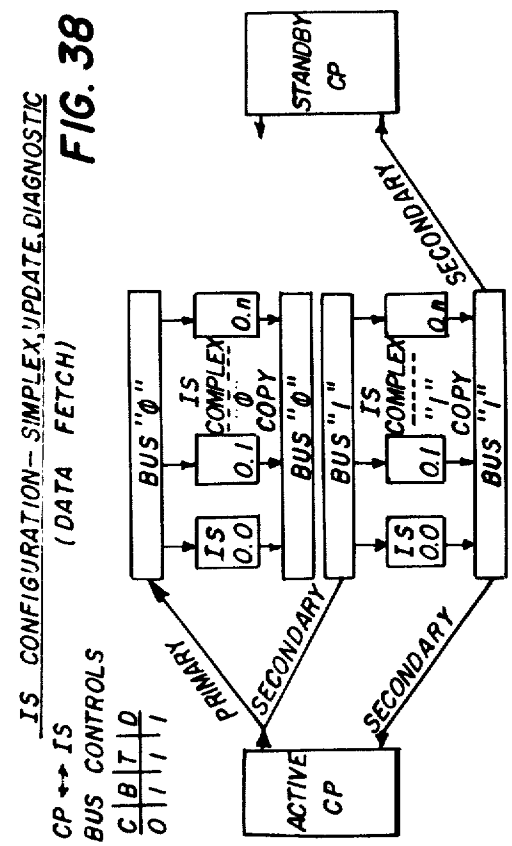
Figure 39:
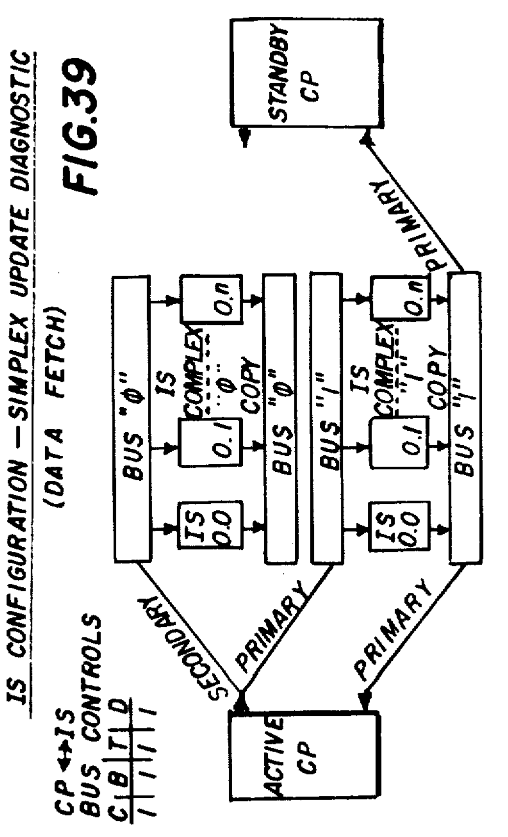
Figure 40:
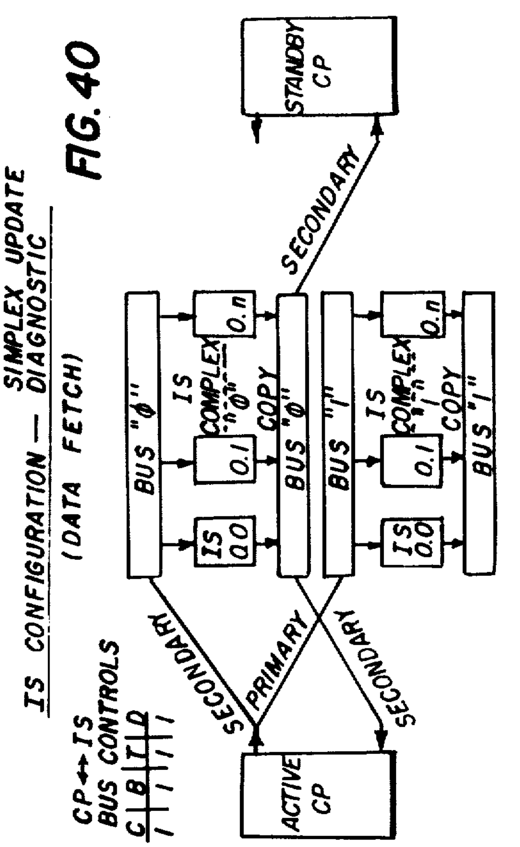
Figure 44:
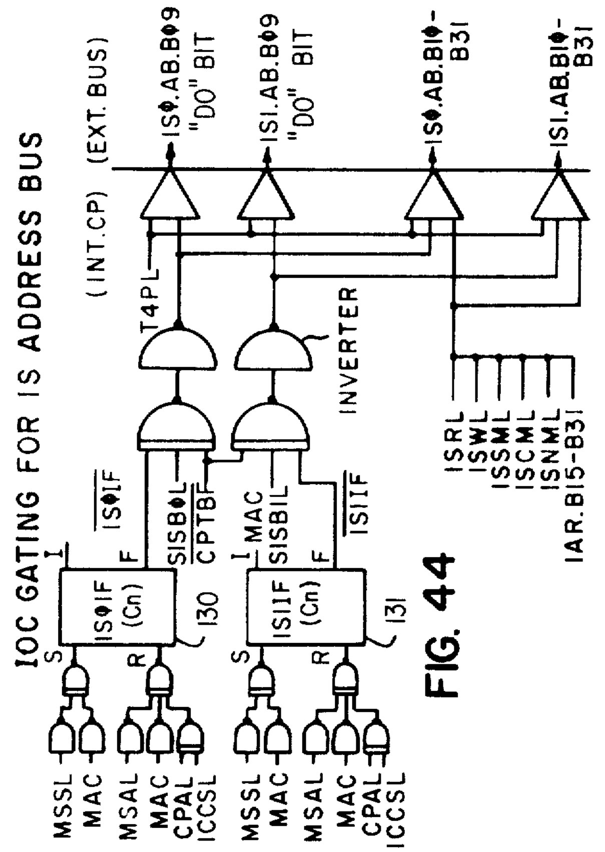
Figure 45:
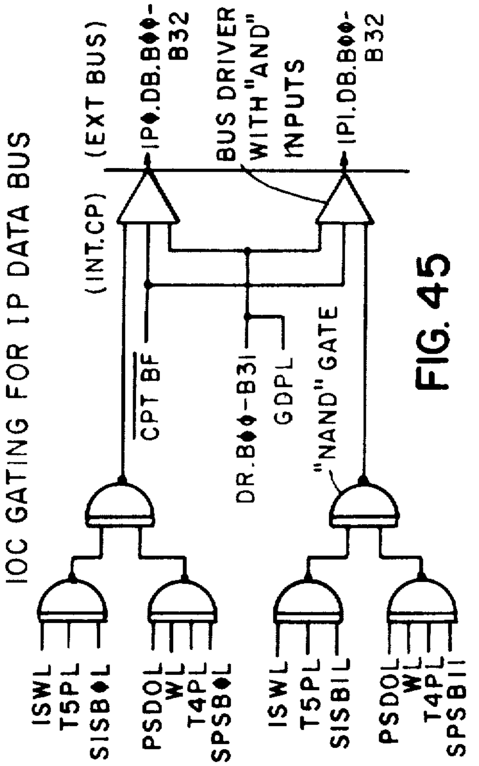
Figure 43:
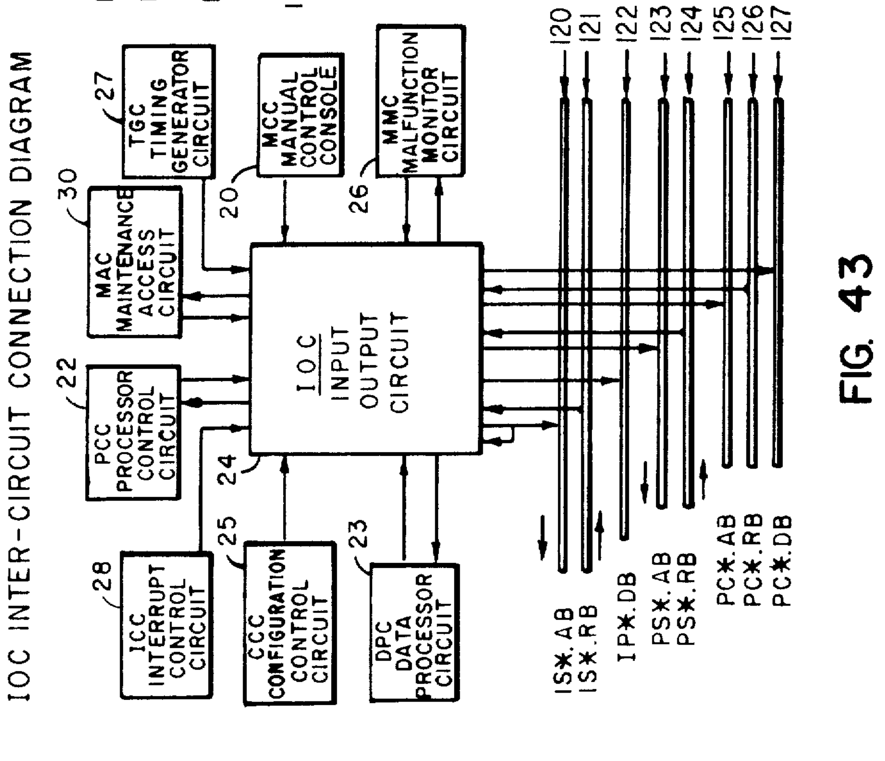
Figure 46:
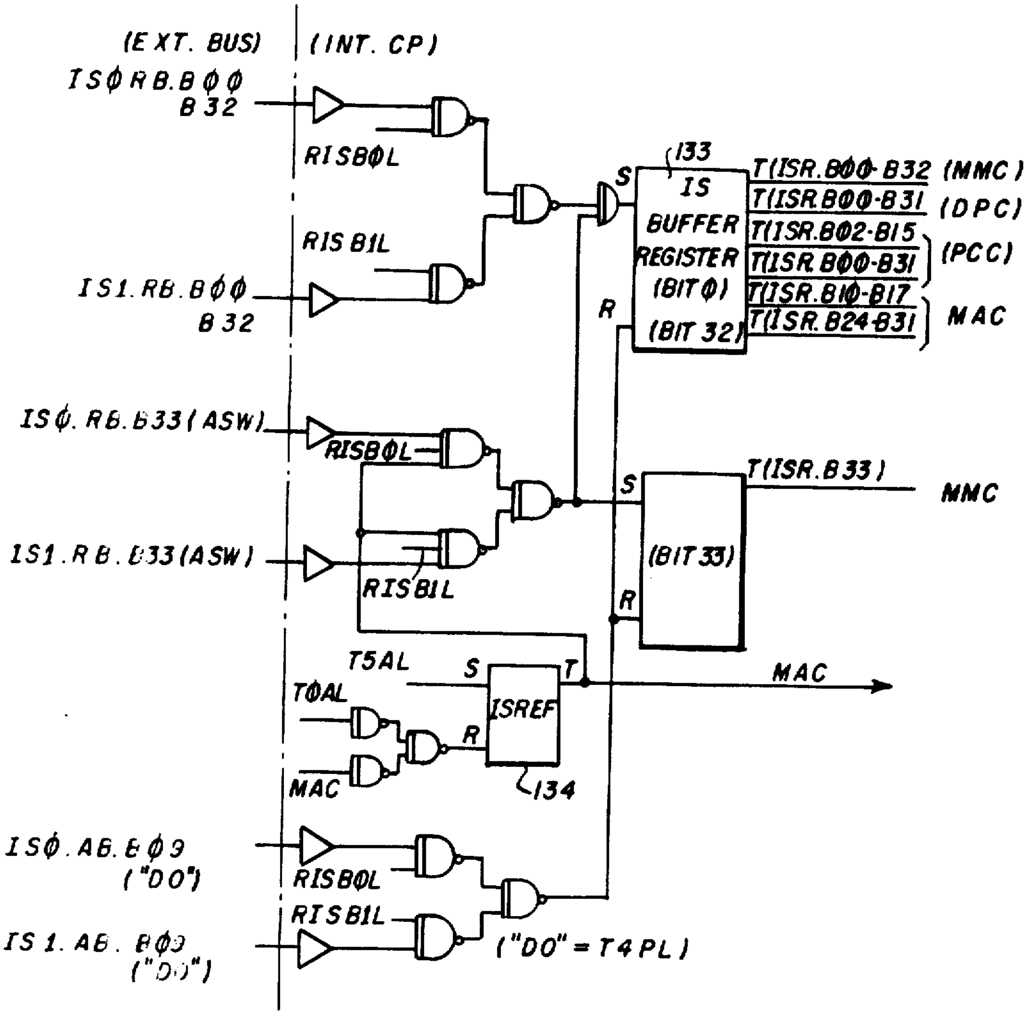
Figures 47, 48:
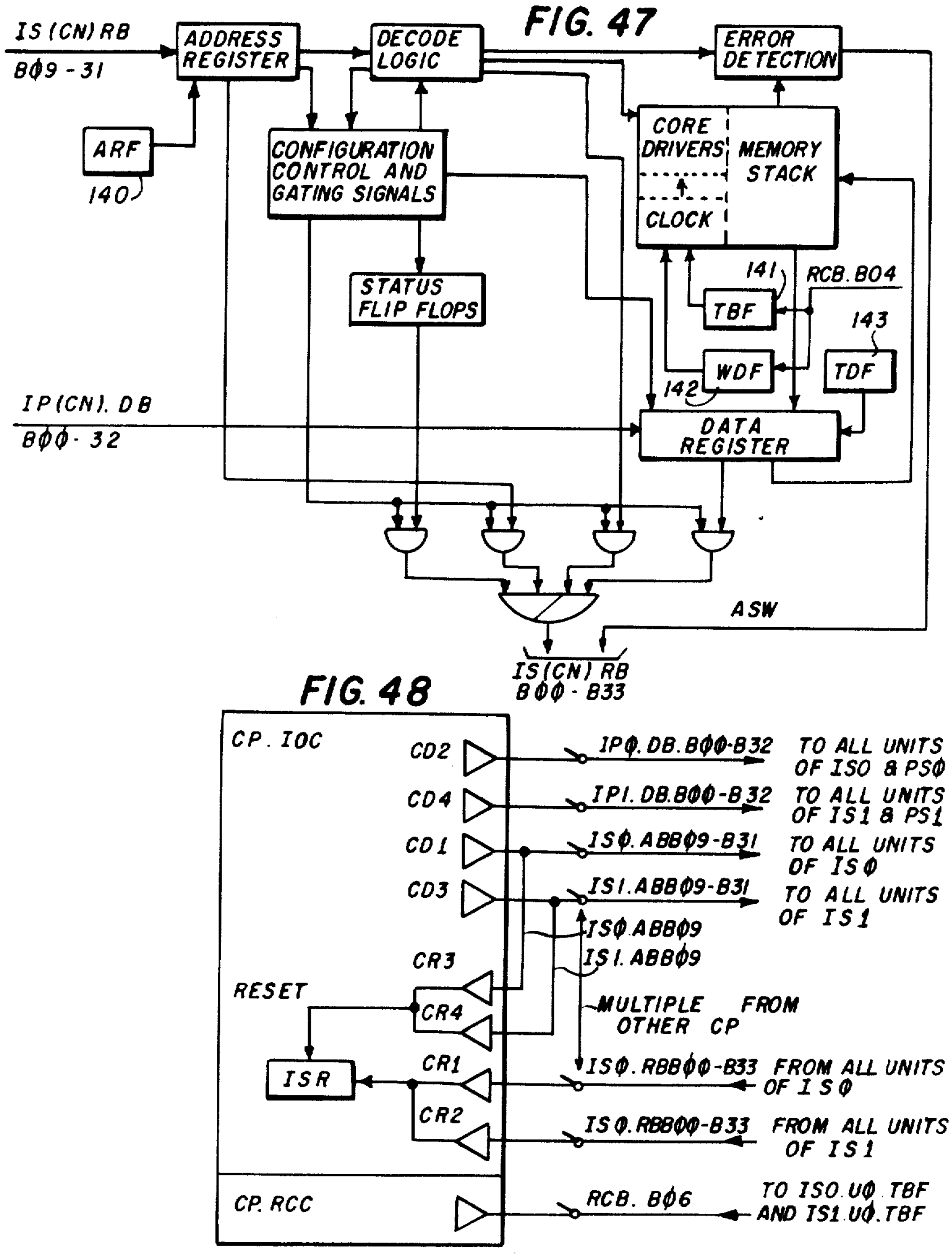
Figure 49:
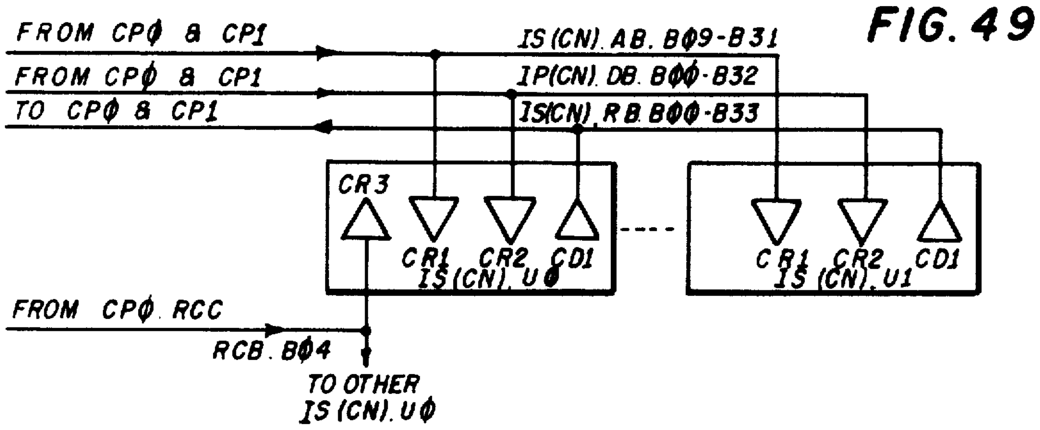
Figure 50:
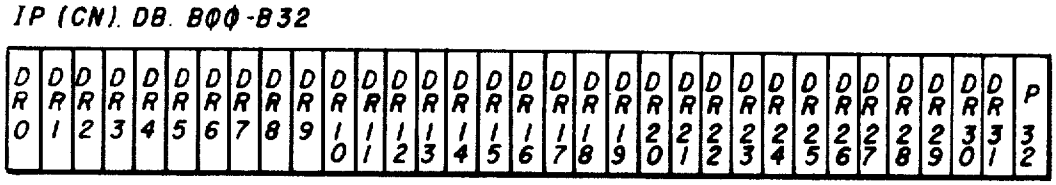

FIGS. 19 and 20 indicate respectively the maintenance control and sense groups for RCC;

FIG. 21 is a block diagram of a portion of the Configuration Control Circuit;

FIG. 22 is a functional block diagram of a dual rank flip-flop;

FIG. 23 is a chart showing the IS bus controls;

FIG. 24 is a table indicating the IS bus control level equations;

FIGS. 25–40 illustrate the various IS/CP configurations;

FIG. 41 is a logic diagram illustrating the Central Processor Active Unit Flip-Flop;

FIG. 42 is a sequence chart illustrating the operation of the circuitry of FIG. 41;

FIG. 43 is a functional flow diagram of the input/output circuit;

FIGS. 44–46 are functional block diagrams illustrating IOC gating for the various Instruction Store Buses;

FIG. 47 is a functional block diagram of an Instruction Store Unit;

FIGS. 48, 49 are schematic diagrams showing the interface between the IS and CP, and between individual units of each IS;

FIG. 50 shows the IS Data Bus format for one Write Control mode; and

Figure 51:
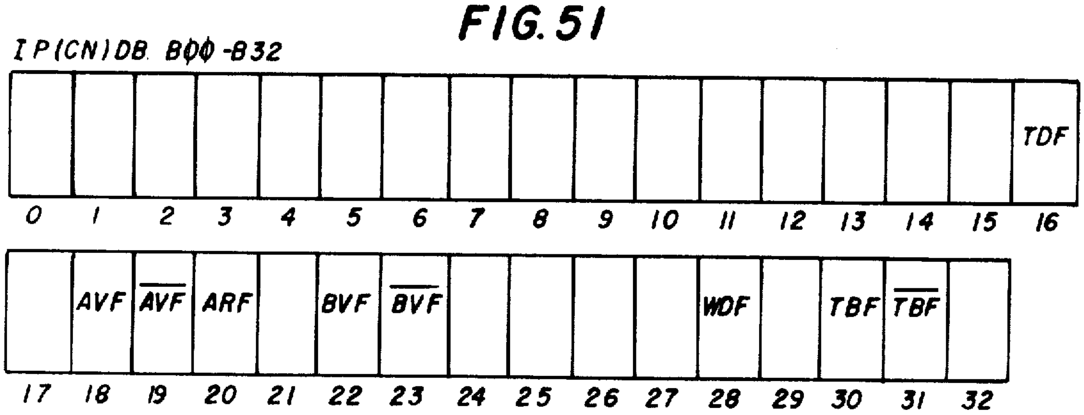

FIG. 51 shows the IS Data Bus format for another Write Control mode.

DETAILED DESCRIPTION

I. Introduction—TSPS

The primary function of the TSPS System is to provide data processor control of the various functions in toll calls which in the past have been performed by operators but have not required the exercise of discretion on the part of the operator. At the same time, the system must permit operator intervention, as required. Thus, various trunks from an end office to a toll center pass through the TSPS System, and these are commonly referred to as Access Trunks, functionally illustrated in FIG. 1 by the block 10.

The access trunks 10 are connected to and pass through access trunk circuits in a network complex 11 which is physically located at the same location as the TSPS base unit, and the network complex 11 permits the system to access each individual trunk line to open it or control it, or to signal in either direction. There is no switching or re-routing of trunks or calls at this location. Each trunk originating at a particular end office is permanently wired to a single termination in a remote toll office while passing through a TSPS network complex or trunk circuit en route.

The various access trunks may originate at different end offices, but regardless of origin, they are served in common by the TSPS System and the operators and traffic office facilities associated with that system. Hence, the equipment interfaces with various auxiliary equipment incidental to gaining access to the throughput access trunks, including remote operator positions, equipment trunks, magnetic tape equipment for recording charges, and various other equipment diagrammatically illustrated by the block 12. Additional details regarding the network complex 11 and the auxiliary equipment and communication lines 12 for a TSPS System may be obtained from the *Bell System Technical Journal* of December, 1970, Vol. 49, No. 10.

The present invention is more particularly directed to one aspect of the data processor which controls the telephony—namely the maintenance circuitry in the Central Processor (CP) which controls the systems and performs call processing as well as maintenance and recovery functions. The central Processor is shown in simplex form within the chain block 17 of FIG. 1.

It will be observed that the telephony equipment is about three orders of magnitude in time slower, on the average, than is necessary to execute individual instructions in modern high-speed digital computers. For example, for the present system a clock increment for the Central Processor is 4 microseconds whereas the trunk circuits are sampled every 10 milliseconds. Hence many functions can be performed in the Central Processor, including internal and external maintenance, table look-ups, computations, monitoring of different access trunks, system recovery from a detected fault, etc. between the expected changes in a given trunk.

The TSPS System uses a stored program control as a means of attaining flexibility for varied operating conditions. Reliability is attained by duplicating hardware wherever possible. A stored program control system consists of memories for instructions and data and a processing unit which performs operations, dictated by the stored instructions, to monitor and control peripheral equipment.

A Control and Maintenance Complex (CMC) contains the Instruction Store Complex (IS*), Process Store Complex (PS*), Peripheral Unit Complex (PC*), and the Central Processor Complex (CP*). The asterisk designates all of the circuitry associated with a complex, including the duplicate copy, if applicable.

The interface between the telephony equipment and the data processor is the Peripheral Unit Complex which includes a number of sense matrices 13 and control matrices 14 together with a Peripheral Controller diagrammatically indicated by the chain block 15.

The principal elements of the data processing circuitry include the Central Processor (CP) 17, a Process Store (PS) enclosed within the chain block 18, and an Instruction Store (IS) enclosed within the chain block 19. A computer operator or maintenance man may gain manual access into the Central Processor 17 by means of a manual control console 20, if desired or necessary.

The Instruction Store (IS) 19 which consists of two copies, contains the stored programs. Each copy has up to eight units as shown in block 19 and includes two types of memory:

1. A read-only unit 19*a* containing a maximum of 16,384 33 bit words.
2. Core Memory in remaining units containing a maximum of seven units of 16,384 33 bit words per unit. Individual words are read from or written into IS by CP 17, as will be more fully described below.

Each IS unit 19 of the eight possible is similar; and they are of conventional design including an Address Register 19*b* receiving digital signals representative of a particular word desired to be accessed (for reading or writing as the case may be). This data is decoded in the Decode Logic Circuit 19*c;* and the recovered data is sensed by sense amplifiers 19*d* and buffered in a Memory Data Register 19*e* which also communicates with the Central Processor 17.

The Process Store (PS) 18 contains call processing data generated by the program. The PS (also in duplicate copies) comprises Core Memory units 18*a* containing a maximum of eight units of 16,384 33 bit words for each copy. Individual words are read from or written into PS by CP in a manner similar to the accessing of the Instruction Store 19, just described. That is, an Address Register 18*b* receives the signals representative of a particular location desired to be accessed; and this information is decoded in a conventional Decode Logic Circuit 18*c*. The recovered information is sensed by sense amplifiers 18*d* and buffered in Memory Data Register 18*e*.

The CMC communicates with the telephony and switching equipment through matrices 13, 14 of sense and control devices. Any number of known design elements will work insofar as the instant invention is concerned. The sense and control matrices 13, 14 are each organized into 32 bit sense words and 32 bit control words. On command of CP, PC samples a sense word and returns the values of the 32 sense points to CP. Each control point is a bistable switch or device. To control telephone and input/output equipment, CP sets a word of control points through PC. PC together with the sense and control matrices comprise the Peripheral Unit Complex (PU).

CP sequentially reads and executes instructions which comprise the program, from IS. The CP reads and executes most instructions in 4 microseconds (one machine cycle time). Those instructions that access IS require 8 microseconds require two machine cycles to be executed and are referred to as "dual cycle" instructions.

The instructions obtained from the IS can be considered "Directives" to the CP specifying that it is to perform one of the following operations:

*a*. Change and/or transfer information inside the CP in accordance with some fixed rule.

*b*. Communicate with the IS or PS by requesting the IS/PS to either;

1. Read a 33 bit word from a specified location, or

2. Write a 33 bit word into a specified location.

*c*. Communicate with the PC by requesting PC to either;

1. Read a specified 32 bit from sense point word, or

2. Write into a specified 32 bit control point word.

*a*. Perform maintenance operations internal to CP by either;

1. Reading from a maintenance sense group, or

2. Writing into a maintenance control group.

The Control and Maintenance Complex may be viewed from two levels: a processing level and a maintenance level. At the processing level (which includes the control and maintenance of the telephone equipment) the CMC appears to be an unduplicated, single processor system as in FIG. 1. At the maintenance level (which here refers only to CMC maintenance) the CMC consists of duplicated copies of the units in each complex, as seen in FIG. 2.

The duplication within the CMC is provided for three purposes:

1. In the event that a failed unit is placed out-of-service, its copy provides continued operation of the CMC.
2. Matching between copies provides the primary means of detecting failures.
3. In-service units can be used to diagnose an out-of-service unit and report the diagnostic results.

Each complex within the CMC may be reconfigured (with respect to in-service and out-of-service units) independently of the other complexes to provide higher overall CMC reliability.

The CMC operation is monitored by internal checking hardware. In the event of a malfunction (misbehavior due either to noise or to failure), the CP is forced into the execution of a recovery program by a maintenance interrupt.

When the malfunction is due to failure, the recovery program will find the failed copy and place it out-of-service. When at least one complete set of units in each complex can be placed in-service, the fault recovery program will terminate after reconfiguring the CMC to an operational system. If a good set of units in each complex cannot be found, the fault recovery program continues until manual intervention occurs.

To facilitate the recovery operation, a hierarchy of in-service copies are defined:

1. One Central Processor must always be in the active state, only the active CP can change the configuration of the CMC,
2. If the other CP is in-service, that CP is the standby CP, and
3. The in-service copies of Instruction Store, Process Store, and Peripheral Control Units are designated as primary and secondary where the primary copies are associated with the active CP.

Each Peripheral Control Unit may also be designated as active or standby; only the active Peripheral Control Unit controls telephone equipment through the sense and control points. Further, the duplicate copies of IS are designated active and standby according to which one (called the "active" one) is associated with the primary CP.

II. The Central Processor —An Overview

The CP circuits provide two specific functions: processing and maintenance. The processing circuits provide a general purpose computer without the ability to recover from hardware failures. The maintenance circuits together with the processing circuits provide the CMC with recovery capability.

The Central Processor is divided into ten circuits. The first four provide the processing function.

1. Timing Generator Circuit (TGC), designated 21,
2. Processor Control Circuit (PCC), 22,
3. Data Processing Circuit (DPC), 23, and
4. Input/Output Circuit (IOC), 24.

The above four processing circuits are described herein only to the extent necessary to understand the present invention. Additional details may be found in the above-referenced copending application of Brenski, et al., Ser. No. 289,718.

The remaining circuits in the CP provide the maintenance function and these include:

5. Configuration Control Circuit (CCC) 25,
6. Malfunction Monitor Circuit (MMC) 26,
7. Timing Monitor Circuit (TMC) 27,
8. Interrupt Control Circuit (ICC) 28,
9. Recovery Control Circuit (RCC) 29, and
10. Maintenance Access Circuit (MAC) 30.

In FIG. 2, there is shown duplicate copies of each of the above circuits in the Central Processor, with like circuits having identical reference numerals.

Turning back to FIG. 1, a pair of Peripheral Controllers is associated with each Peripheral Control Unit (PCU). Each Peripheral Controller 15 includes the following circuits which are also described in more detail in the above-references Brenski, et al. application Ser. No. 289,718:

1. A Matrix Access Circuit 33,
2. An Address Register Circuit 34,
3. A Data Register Circuit 35,
4. A Timing Generator Circuit 36,
5. A Maintenance Status Circuit 37,
6. An Address Decode Circuit 38, and
7. A Control Decode Circuit 39.

Figure 2:
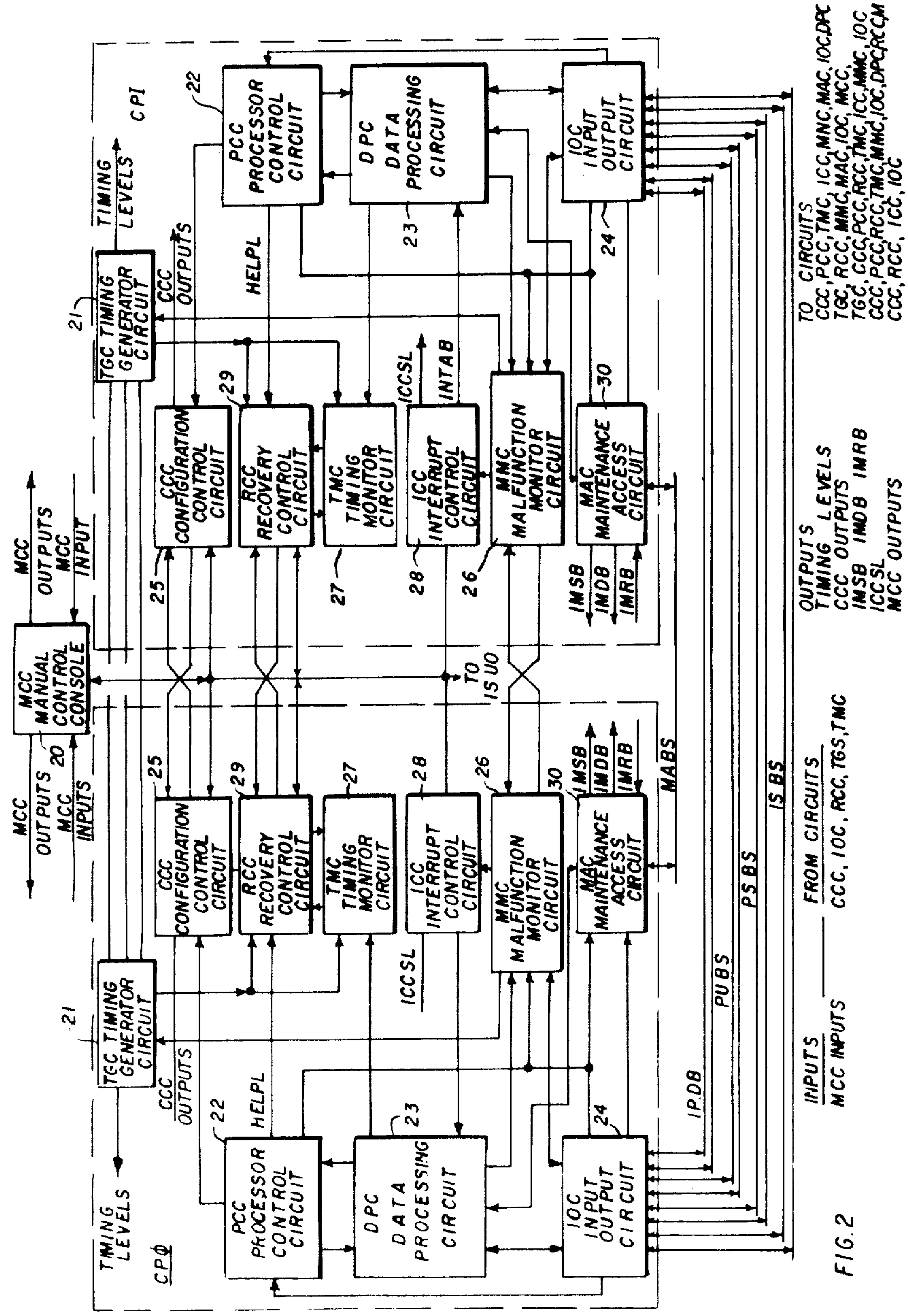
FIG. 2 is a functional block diagram showing redundant copies of the Central Processor and their associated busing systems.
Figure 2A:
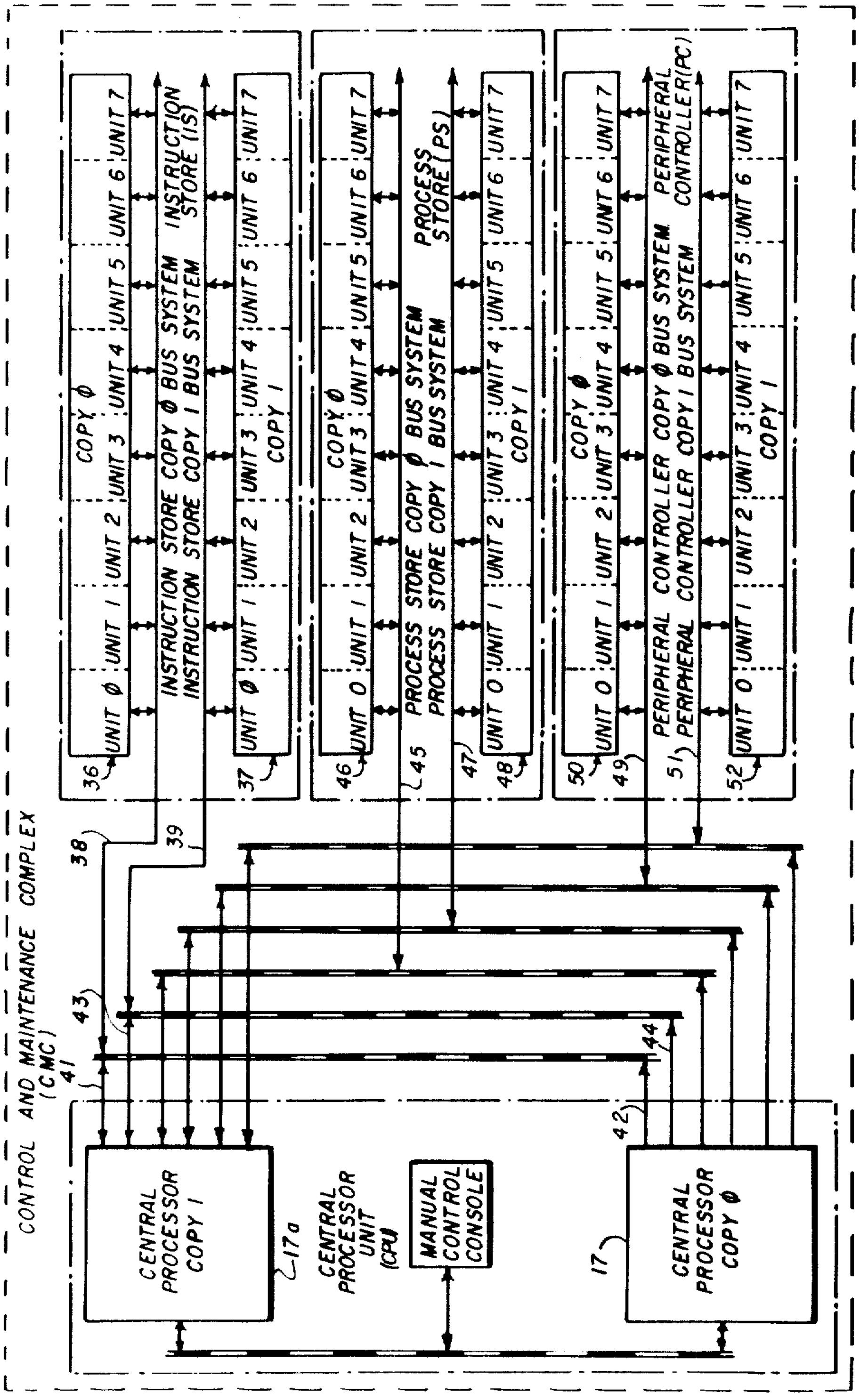
FIG. 2A is a functional block diagram showing communication between both copies of the Central Processor and duplicate copies of the Instruction Store, Process Store, and Peripheral Controller.

The functional interface between the Central Processor, and other system equipment, is shown in functional block diagram form in FIG. 2A. As can be seen, there is intercommunication between both copies of the Central Processor designated 17 and 17*a* respectively and the manual control console. Maintenance personnel can monitor the status and manually reconfigure the control and maintenance complex from this console.

As can also be seen in FIG. 2A, both Central Processor copies have direct, two-way communication links between each other, via internal bus 35, and with both copies of Instruction Store, designated 36 and 37 respectively, via their associated bus systems 38 and 39. Similar communication is provided with the Process Store, and the Peripheral Controllers. This interface is provided by six separate bus systems.

I. An Instruction Store copy ϕ bus system (ISϕ.BS) is designated 38. This interfaces both copies 17a, 17 of the Central Processor via buses 41, 42 with each of the 8 units (ISOϕ.Uϕ through ISϕ.U7) that form Instruction Store Copy ϕ (ISϕ) generally designated 36.

II. An Instruction Store copy 1 bus system (IS1.BS) is designated 39. This interfaces both copies of the Central Processor via buses 43, 44 with each of the 8 units (IS1.Uϕ) through IS1.U7) that form Instruction Store copy 1(IS1), generally designated 37.

III. A Process Store copy ϕ bus system (PSϕ.BS) is designated 45; and it interfaces both copies of the Central Processor with each of the 8 units (PSϕ.Uϕ through PSϕ.U7) that make up Process Store Copy ϕ (PSϕ), generally designated 46.

IV. A Process Store copy 1 bus system (PS1.BS) is designated 47; and it interfaces both copies of the Central Processor with each of the 8 units (PS1.Uϕ through PS1.U7) that make up Process Store copy 1 (PS1), generally designated 48.

V. A Peripheral Controller copy ϕ bus system (PCϕ.BS) is designated 49; and it interfaces both copies of the Central Processor with each of the 8 Peripheral Controllers (PCϕ.Uϕ through PCϕ.U7) in Peripheral Control copy ϕ (PCϕ), generally designated 50.

VI. A Peripheral Controller copy 1 bus system (PC1.BS) is designated 51; and it interfaces both copies of the Central Processor with each of the 8 Peripheral Controllers (PC1.Uϕ through PC1.U7) in Peripheral Control copy 1 (PC1), generally designated 52.

Each copy of the Peripheral Control bus system contains an address bus (PCϕ.AB and PC1.AB), a return bus (PCϕ.RB and PC1.RB), and a data bus (PCϕ.DB and PC1.DB). Each copy of the process store bus system contains an address bus (PSϕ.AB and PS1.AB) and a return bus (PSϕ.RB and PS1.RB). Each copy of the Instruction Store bus system contains an address bus (ISϕ.AB and IS1.AB, and a return bus (ISϕ.RB and IS1.RB). Each copy ϕ of the Instruction Store bus system and the ProcessStore bus system share the same data bus: Instruction Store and Process Store copy ϕ data bus (IPϕ.DB). Each copy 1 of the Instruction Store bus system and the Process Store bus system also share the same data bus: Instruction Store and Process Store copy 1 data bus (IPI.DB).

This data bus sharing by Instruction Store and Process Store affects the sequence of instructions that are to be executed by the Central Processor. An instruction directing the Central Processor to access (read from or write into) Process Store requires only one machine cycle, while an instruction directing the Central Processor to access Instruction Store requires two machine cycles. This means that the Central Processor can execute Process Store instructions in sequence, one after the other, for as long as needed, and it can also execute an Instruction Store instruction immediately following a Process Store instruction. However, it cannot execute two Instruction Store instructions, in sequence, nor can it execute a Process Store instruction immediately after an Instruction Store instruction, because of the shared data bus. The Central Processor will have been in the execution of an Instruction Store instruction only one machine cycle of the two required, when it starts executing the next instruction in sequence, and these two instructions cannot use the same data bus (IPϕ.DB or IPI.DB) simultaneously.

It is believed that a better understanding of the present invention will be obtained if there is an understanding of the overall function of each circuit in the CP, realizing that there are duplicate copies of the CP.

II. A. Processing Circuits of Central Processor Timing Generator Circuit (TGC)

Figure 1:
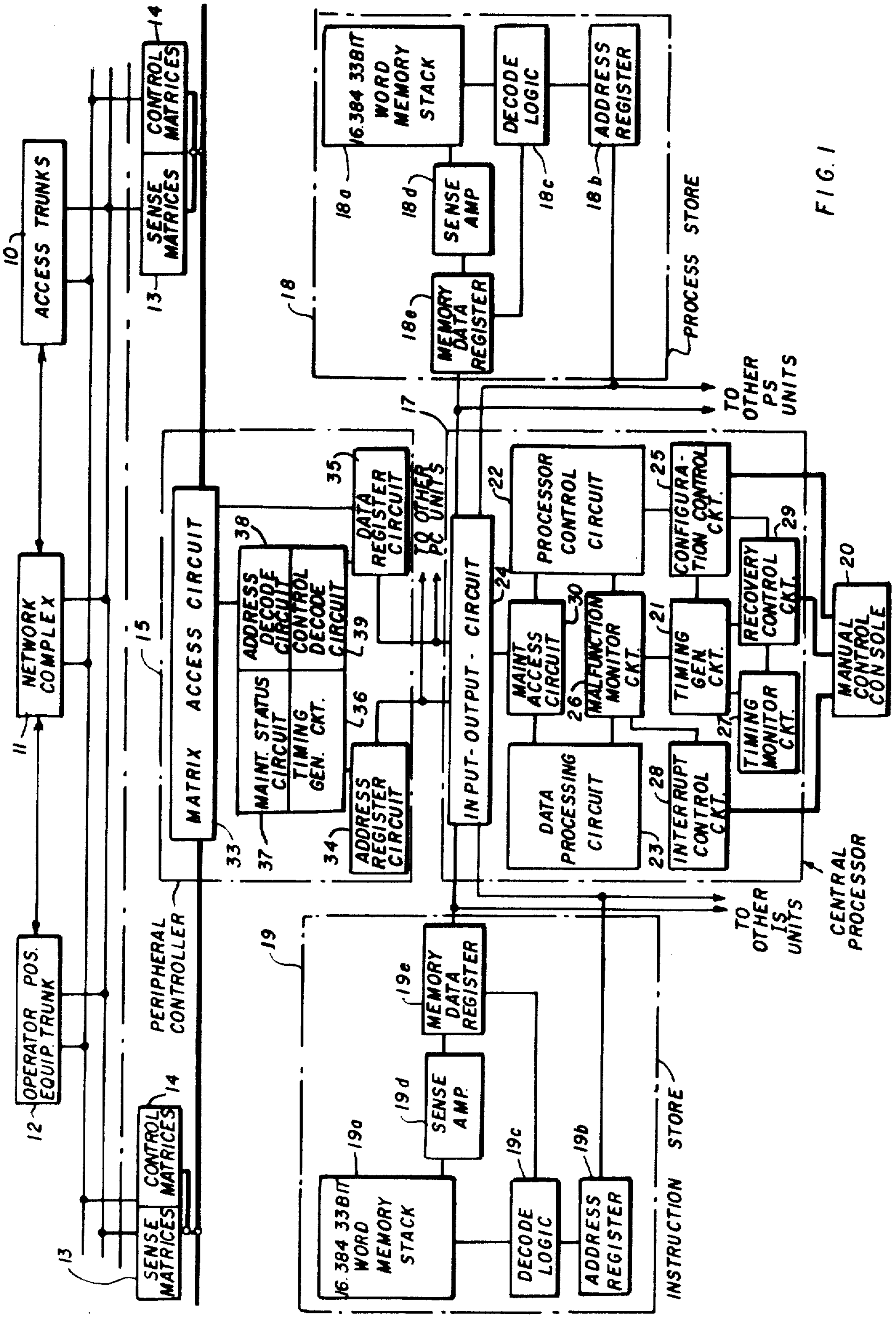
FIG. 1 is a functional block diagram of a TSPS System, including a Control and Maintenance Complex.
Figure 3:
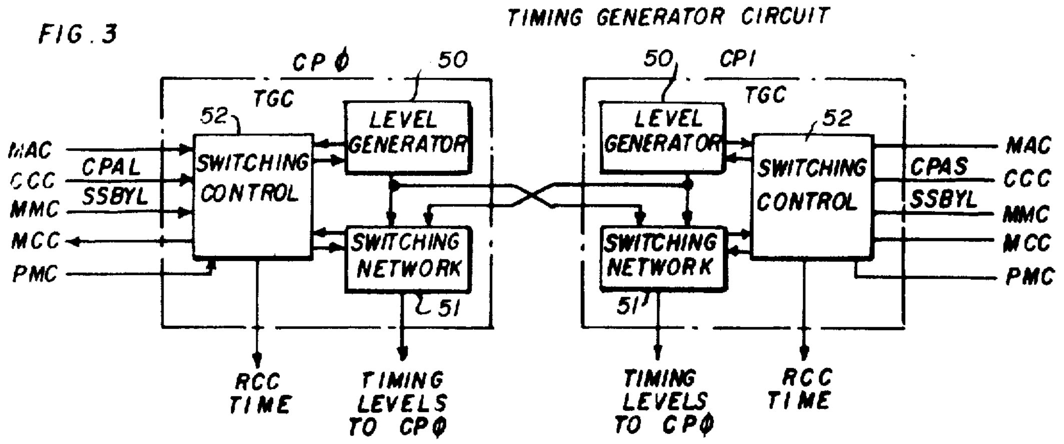
FIG. 3 is a functional block diagram of the Timing Generator Circuit of the Central Processor.

The Timing Generator Circuit 21 of FIGS. 1 and 2 (TGC) creates the timing intervals for the Central Processor. A more detailed functional block diagram for the TGCs of both Central Processors is shown in FIG. 3.

The TGC includes a level generator circuit 50 and creates eight timing intervals (or "levels" as they are referred to) every 4 μseconds. Each pulse is picked off a delay line. For each timing interval, TGC produces a 500 nano second (ns) timing interval place level (PL) and a 400 ns. timing interval accept level (AL). Each sequence of 8 timing intervals is called a cycle. Nearly all sequential control in the CP is provided by the timing interval place and accept levels.

Generally, the timing interval place levels are used to gate information out of flip-flop storage while timing interval accept levels are used to accept information into flip-flop storage.

The TGC in each CP generate timing levels. To assure synchronism between CP's, Timing levels generated in the active CP control both CP's. A switching network 51 actuated by a switching control circuit 52 in each TGC transmits (if it is in the active CP) or receives the timing levels from the active TGC, and supplies them to the CP circuits. The standby CP may be stopped by directing the TGS in the standby CP to inhibit reception of timing levels. The TGS also notifies the Recovery Control Circuit 29 (RCC) and Timing Monitor Circuit 27 (TMC) for maintenance purposes whenever the CP's active/standby status changes.

Processor Control Circuit (PCC)

Figure 4:
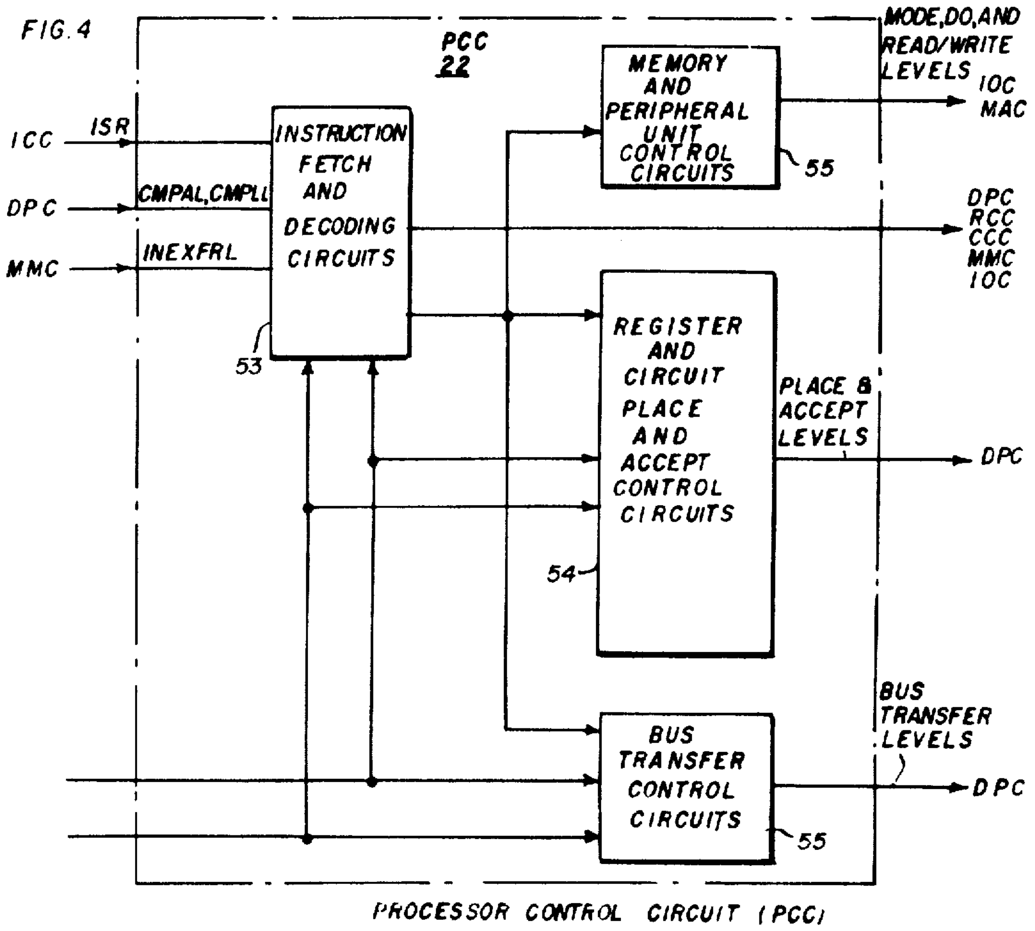
FIG. 4 is a functional block diagram of the Processor Control Circuit of the Central Processor.

The PCC 22 (see FIG. 4 for a more detailed functional block diagram) includes instruction fetch and decode circuits 53 which decode each instruction and generate the control signals required to execute the instruction and to read the next instruction from IS.

The instructions are performed in the DPC 23 by a sequence of data transfers—one in each of the eight timing intervals. Each data transfer is controlled by three simultaneous command from the PCC to the DPC:

1. A register place command (generated in block 54) which places a DPC register or circuit on the Interval Output Bus of the PCC.
2. A Bus Transfer Command (generated in bus transfer control circuits 55) which transfers the information on the Internal Output Bus to the Internal Input Bus, and 3. A Register Accept Command (also generated in block 54) which gates the information on the Internal Input Bus to a DPC register.

The PCC also provides auxiliary commands to the DPC such as the selection of the function to be provided by the Logic Comparator Circuit (LCC).

Memory and peripheral unit control circuits 55 of the PCC provide the control signals to the IOC including the mode bits to be transmitted to these complexes.

The instruction fetch logic of block 53 controls an Instruction Address Register IAR, Add One Register AOR, and the instruction store read for the next instruction. The next instruction is read from the Instruction Store simultaneously with the execution of its predecessor.

The PCC also decodes the HELP instruction which is an input to the RCC that initiates a system recovery program interrupt. The instructions RMSG, WMSG, and WMCP are decoded by the PCC but are executed by the Maintenance Access Circuit 30 (MAC). The Malfunction Monitor Circuit 26 (MMC) requires decoded instructions levels from the PCC in order to sample malfunction detection circuits.

Data Processing Circuit (DPC)

The DPC 23 (see also FIG. 5) contains the registers of the CP and the circuits required to perform arithmetic, logical, decision, and data transfer operations on the information in these registers. The General Registers (GR1, . . . , GR7), in the Storage Section 56, the Special Purpose Register (SPR), also in Storage Section 56, and the Instruction Address Register (IAR) in the Address Section 57 are the program accessible registers. These registers and the operations which are performed on these registers by individual instructions are described more fully in the above-referenced application.

The remaining registers [Data Register (DR) and Arithmetic Register (AR) in Data Section 58, the Selection Register (SR), and Add One Register (AOR)-]and circuits (Logic Comparator Circuit (LCC), Add Circuit (ADC) the Add One Circuit (AOC), and the Bus Transfer Circuit 59 (BTC) provide the data facilities required to implement the instruction operations on the program accessible registers.

A 32 bit Internal Input Bus (IIB) 60 is the information source for all DPC registers. In general, the DPC registers and circuits as well as other CP circuits place information on the 32 bit Internal Output Bus (IOB) 61. The Bus Transfer Circuit (BTC) 59 transmits information from the IOB 61 to the IIB 60. The information can be transferred in six ways which include complementing or not complementing the information, exchanging 16 bit halves (with or without complementing), or shifting the information left or right one bit.

A logic and compare circuit (LCC) provides a 32 bit logical AND, NOR, or EQUIVALENCE of the AR and DR and also matches the AR and DR. The ADD Circuit (ADC) provides the sum of the left half of the AR and the right half of the AR. The ADC is used for addition and subtraction and to generate PS and PU addresses. The 17 bit Instruction Address Register (IAR) is used to address the Instruction Store. The Add-One-Circuit (AOC) increments the right most 16 bits of the IAR by one. The AOC is used to compute the next instruction address (one plus the current address) which will be used if a Program Transfer does not occur.

Input Output Circuit (IOC)

The primary function of the IOC 24 (see also FIG. 6) is to provide the interface through which the Central Processor complex (CP*) gains access to the non-CP complexes IS*, PS*, and PC*) via the external bus system. As seen diagrammatically in FIG. 6, the IOC sends data and addresses from the CP to the non-CP complexes and also receives and buffers data transmitted to the CP from non-CP complexes. The external bus system, used to transmit information between CP* and the non-CP complexes, comprises the Instruction Store Address Bus (IS*.AB), Process Store Address Bus (PS*.AB), Peripheral Control Address Bus (PC*.AB), Instruction Store-Process Store Data Bus (IP*.DB), Peripheral Control Data Bus (PC*DB), Instruction Store Return Bus (IS*.RB), Process Store Return Bus (PS*.RB), and Peripheral Control Return Bus (PC*.RB).

Each bus consists of two copies which are associated with corresponding copies of IS*, PS*, and PC*. At the processing level, the IOC may be considered to use both copies of the bus without distinction between the copies. To provide the reconfiguration capability (maintenance level), the IOC transmits on or receives from copy $\phi$, copy 1, or both copies of a particular bus. The choice of bus copies is determined by the Configuration Control Circuit 25.

There are three buffer registers in the IOC: the Instruction Store Register (ISR) designated 62, the Process Store Register (PSR) 63, and the Peripheral Unit Register 64. These registers communicate with both copies of the Return Buses from IS, PS and PU respectively; and they send received data to the DPC 23 and MMC 26, as shown.

II. B. Maintenance Circuits

The functions performed by the CP maintenance circuits include the following:

1. System configuration control (CCC 25),
2. Malfunction detection (MMC 26, TMC 27, DPC 23),
3. Recovery program initiation (ICC 28),
4. Recovery program monitoring (RCC 29, TMC 27),
5. Maintenance program access to CP circuits (MAC 30, MMC 26), and
6. Manual system control (MCC 20).

The CMC detects malfunctions as follows:

1. By matching, between CP copies, all data transfers in the CP Data Processing Circuit (MMC),
2. By parity checking of all memory read operations (MMC),
3. By monitoring internal checks by the IS*, PS*, and PC* (all-seems-well checks),
4. Address echo matching of addresses sent to IS*, PS*, and PC* with the echo address returned by the complex (DPC),
5. Timing level generation checking (TMC), and
6. Excess program time checking (DPC).

Figure 8:
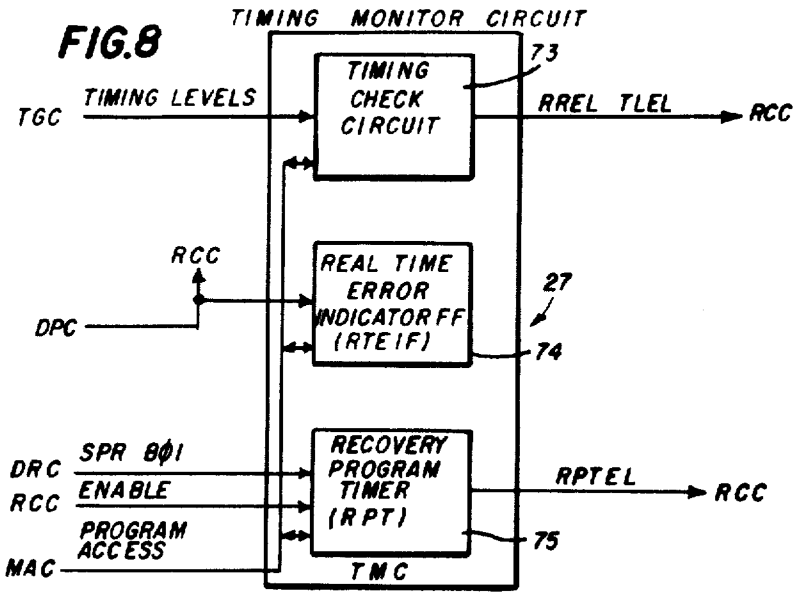
FIG. 8 is a functional block diagram of the Timing Monitor Circuit of the Central Processor.

When a malfunction is detected by MMC 26, the Interrupt Control Circuit (ICC) 28 may initiate a maintenance interrupt to a recovery program. The recovery program attempts to locate the faulty unit, remove it from service, and reconfigure the complexes to a working system. The execution of the recovery programs are monitored by the TMC 27 and the RCC 29. The system recovery program is initiated (reinitiated) by the TMC 27 and the RCC 29 when higher level recovery is required. The Timing Monitor Circuit monitors recovery programs through the Recovery Program Timer (RPT) in the TMC 27 (see FIG. 8). If a recovery program fails to remain in synchronism with this timer, the TMC initiates (or re-initiates) the system recovery program through the Recovery Control Circuit. The execution of a HELP instruction may also initiate (re-initiate) the system recovery program directly through the RCC.

Malfunction Monitor Circuit (MMC)

Figure 7:
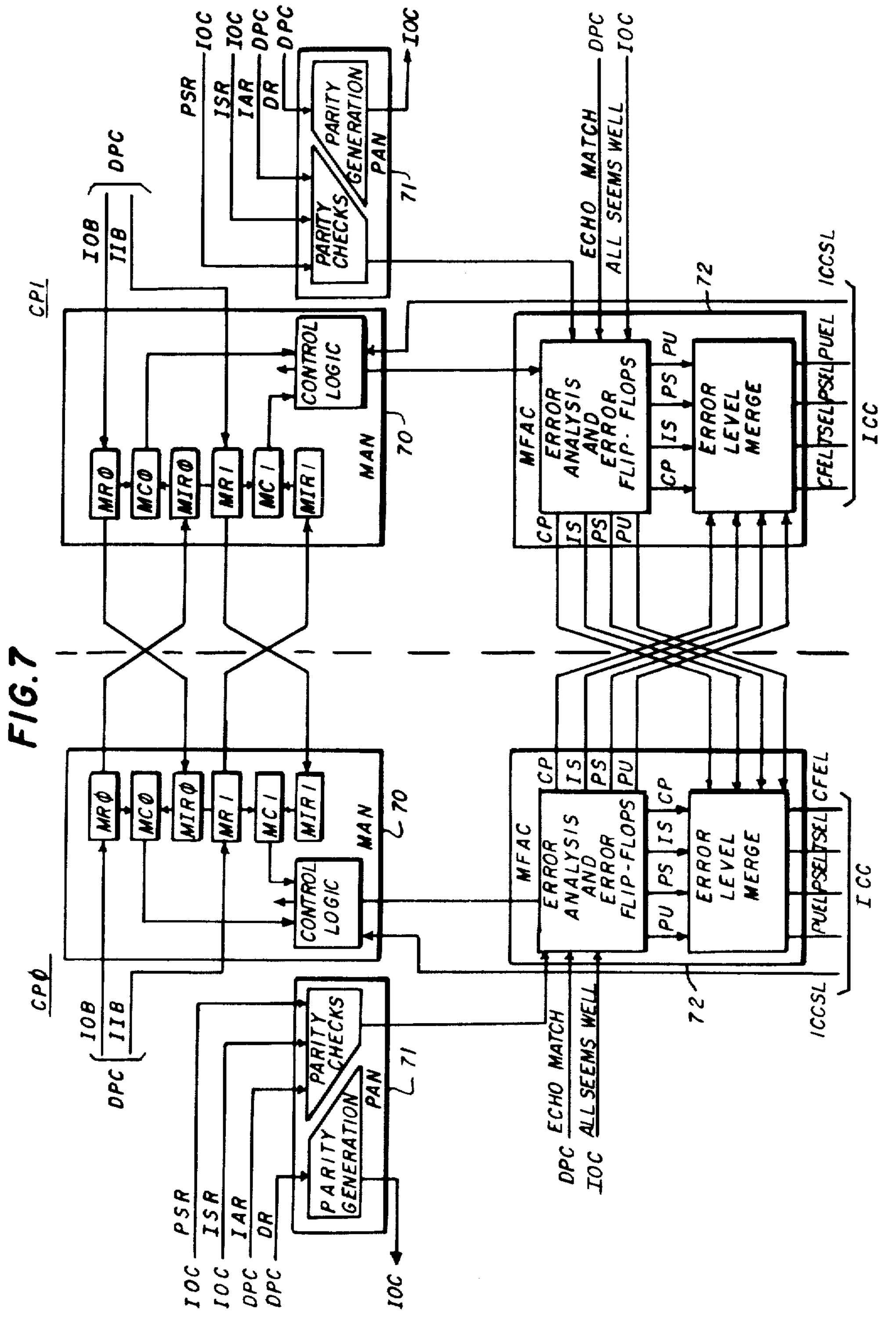
FIG. 7 is a functional block diagram of the Malfunction Monitor Circuit of the Central Processor.

The MMC 26 (seen in more detail in FIG. 7) provides the following maintenance functions:

1. Detection of malfunctions during the execution of programs,
2. Classification of malfunctions into CP*, IS*, PS*, and PC* caused malfunctions,
3. Indication of a CP, IS, PS, or PC malfunction occurrence to ICC in each CP,
4. Storage of malfunction indications on error flip-flops,
5. Storage of the address of the instruction being executed when a maintenance interrupt occurs,
6. Special facilities for use by recovery programs,
7. Access to standby CP for extraction of diagnostic data through the match facilities,
8. Facility to monitor standby CP executing off line maintenance programs (Parallel Mode), and
9. Facilities for routining the MMC itself.

The Malfunction Monitor Circuit 26, shown is divided into the following three sub-circuits:

1. MAtch Network (MAN), designated 70,
2. PArity Network (PAN), designated 71, and
3. Malfunction Analysis Circuit (MFAC), designated 72.

The MAtch Network (MAN) provides all inter-Central Processor matching facilities. In addition to malfunction detection, the match network can be used for extracting diagnostic data from the standby CP for routining the match network itself. The control logic within the MAN controls the match network according to match modes selected by the maintenance programs.

The PArity Network 71 (PAN) contains all the Parity Circuits used in checking the transmission and storage of information in the Instruction Store (IS*) and Process Store (PS*).

The Malfunction Analysis Circuit 72 monitors malfunction detection signals from 1. MAN (inter CP matching),
2. PAN (parity checks),
3. DPC (address echo match), and
4. IOC (all-seems-well signals).

The malfunction detection signals are sampled according to the timing intervals and instructions being executed. When a malfunction is detected an error flip-flop associated with the detection circuit is set to be used by maintenance program to isolate the source of the malfunction.

The malfunction analysis circuit classifies the malfunction according to its most likely cause (CP*, IS*, PS*, or PC*) and a corresponding error level (CPEL, ISEL, PSEL, or PUEL) is sent to the Interrupt Control Circuit (ICC) in both CP's.

Timing Monitor Circuit (TMC)

The TMC 27 (FIG. 8) provides three timing malfunction detection circuits:

1. Timing check circuit 73 which checks the timing levels generated by TGC,
2. A Real Time Timer Error FF (RTEIF) 74 which monitors the state of the overflow of the Real Time Timer RTT in DPC, and
3. A Recovery Program Timer (RPT) 75 which monitors recovery program execution.

Most failures of the active Timing Generator Circuit (TGC) do not cause inter-CP mismatches. These failures are detected by the TGC checking circuitry of the active TMC. The output of this Circuit is monitored by the active Recovery Control Circuit (RCC).

Failures of the standby TGC will cause inter-CP mismatches and are detected by the Malfunction Monitor Circuit. The standby RCC ignores error outputs of the standby TMC.

RTT, which is located in the DPC, has both an operational and a maintenance function. It provides real time synchronization for the operational programs and a sanity check on the execution. The RTT is a fourteen bit counter which is incremented by one every CP cycle (4 microseconds). The program may read or modify RTT through the Special Purpose Register (SPR). In this manner, RTT can provide time intervals of up to 65 milliseconds for the operational programs. The programs, however, must re-initialize RTT often enough to prevent the overflow from occurring. The active RCC monitors the RTT overflow. If the overflow occurs, RTEIF is set and the RCC initiates the system recovery operation.

RPT checks the execution of the Recovery programs. RPT is a seven bit counter which, when enabled, is incremented by one every CP cycle. RPT is enabled whenever a maintenance interrupt occurs and is disabled by the recovery program through MAC when recovery is completed.

The active RCC monitors the RPT of the active TMC and initiates further system recovery operations if the recovery programs fail to reset the RPT in the correct interval. The RPT has two checking modes. When first enabled by a maintenance interrupt, the recovery program must check into the RPT through the SPR exactly every 128th cycle. The recovery program may change the checking mode to permit check-in before the 128th cycle. In the second mode, checkins may not be more than 128 CP cycles apart. The recovery program changes the checking mode or disables the RPT through MAC and must do it at exactly the 128th cycle.

Interrupt Control Circuit (ICC)

Figure 9:
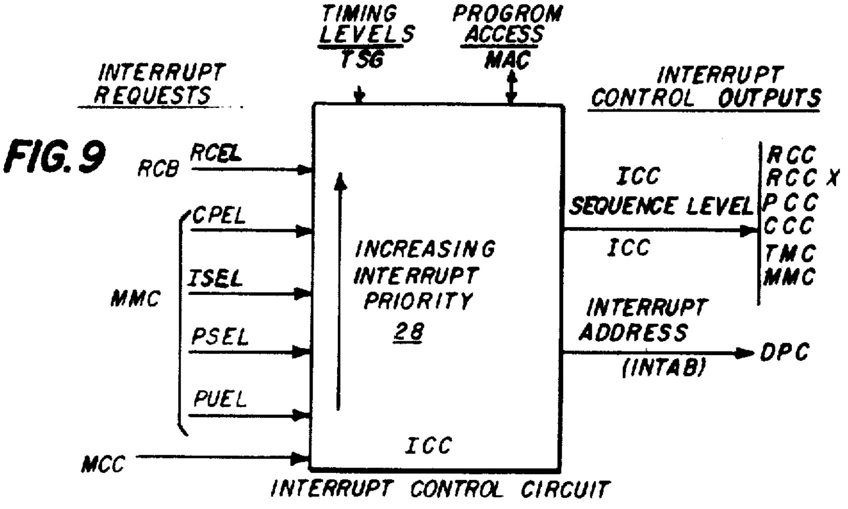
FIG. 9 is a functional block diagram of the Interrupt Control Circuit of the Central Processor.

The ICC 28 (FIG. 9) controls the execution of maintenance interrupts. A maintenance interrupt is a one-cycle wired transfer instruction which causes the CMC to begin execution of a recovery program. The malfunction detection circuits in the CP initiate maintenance interrupt whose execution takes precedence over the execution of any other CP instructions.

The ICC provides five maintenance interrupts:

1. System Recovery.
2. CP recovery,
3. IS recovery,
4. PS recovery, and

5. PU recovery.

When an interrupt occurs, the ICC products an ICC interrupt Sequence Level (ICCSL) which controls the execution of the interrupt in the other CP circuits. The recovery program address corresponding to the interrupt is also placed on the INTerrupt Address Bus (INTAB) to the Data Processing Circuit, from which it is sent to the IS.Uϕ as the address of the next instruction to be executed.

The Malfunction Monitor Circuit initiates the CP, IS, PS, and PU recovery interrupts. The Recovery Control Circuit or the Manual Control Console initiates the system recovery interrupt. An interrupt may be initiated by either circuit during the execution of an operational program when a malfunction occurs. During the execution of a recovery program additional interrupts may occur as a part of the recovery process.

To handle simultaneous interrupts and interrupts during execution of a recovery program, the ICC Produces maintenance interrupts according to a priority structure. The system recovery interrupt has highest priority and cannot be inhibited. The CP, IS, PS, and PU interrupts follow respectively in descending order of priority. A CP, IS, PS, or PU interrupt can occur if the interrupt itself or a higher priority interrupt has not already occurred. CP, IS, PS, and PU interrupts may be individually inhibited by the maintenance programs.

Recovery Control Circuit (RCC)

Figure 10:
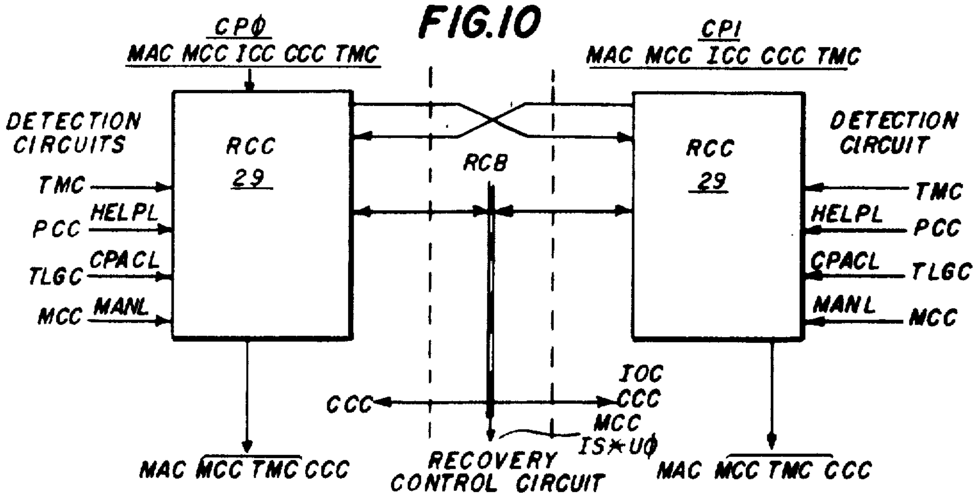
FIG. 10 is a functional block diagram of the Recovery Control Circuit of the Central Processor.

The RCC 29 (shown in duplicate copy in FIG. 10) monitors the malfunction detection circuits which cause system recovery program interrupts. The detection inputs to the RCC (RCC triggers) are produced by the timing generation check circuit in the TMC, error level from the DPC, the Recovery Program Timer in the TMC, a HELP instruction executed by the PCC, CP active unit change detected by the TGC, and a manual request from the MCC.

Only the active RCC accepts triggers and initiates system recovery action. The RCC in the Standby CP is kept in synchronism with the active RCC but cannot affect the operation of the CMC.

When a trigger to the active RCC occurs, the RCC executes a wired logic reconfiguration program and then requests the ICC to execute a system recovery program interrupt. If the system recovery program cannot be completed (i.e., the configuration is not operable), another trigger occurs. Each consecutive trigger causes the RCC to force one of the four combinations of CP*, and IS*.Uϕ configurations CPϕ–ISϕ.Uϕ, CP1-ISϕ.Uϕ, CP1-ISI.Uϕ, and CPϕ-ISI.Uϕ). When an operating CP*-IS*.Uϕ configuration is selected, the system recovery program completes the recovery and reconfiguration process without further intervention by the RCC.

Configuration Control Circuit (CCC)

Figure 11:
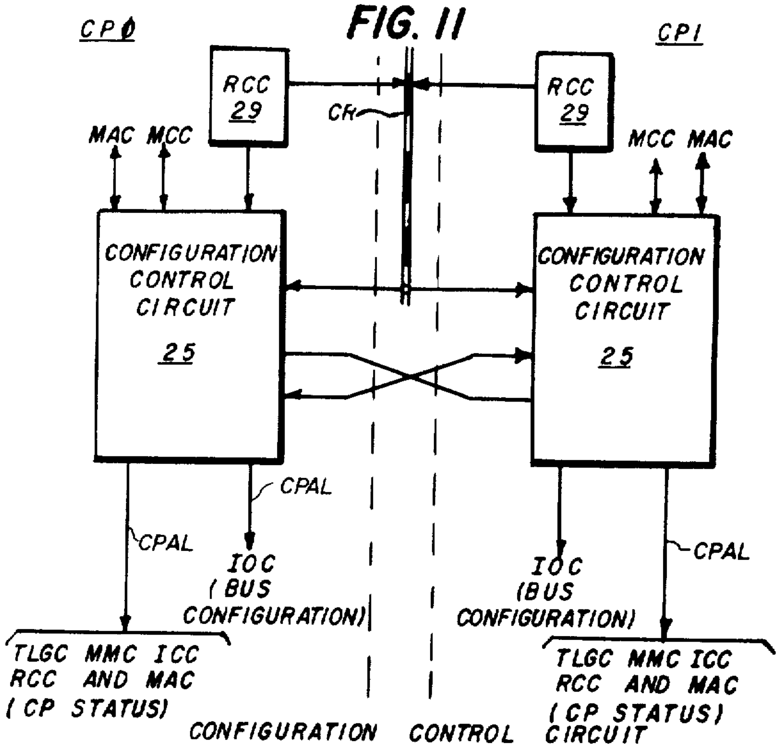
FIG. 11 is a functional block diagram of the Configuration Control Circuit of the Central Processor.

The CCC 25 (FIG. 11) defines the system configuration by controlling:

1. CP* status, and
2. The CP*-IS&, CP*-PS*, and CP*-PC* configurations.

The CP status is specified by:

1. The active CP indication,
2. The standby CP trouble status, and
3. The CP-CP error signal status (separated CPs or coupled CPs).

Each of the IS*, PS*, and PU*, has a bus system (address bus, data bus—the PS and IS share a data bus, and return bus). Each copy within IS*, PS*, and PU* is permanently associated with an individual bus copy. The CCC defines the CP*-IS*, CP*-PS*, and CP*-PC* configuration by specifying the bus copy on which each CP copy sends and receives.

The CCC first defines a primary bus copy for each of the IS, PS, and PC bus systems. The active CP always sends and receives on the primary bus. The standby CP sends and receives according to the specific bus configuration. For each primary bus copy selection, four bus configurations can be defined:

1. DUPLEX specifying that the standby CP sends on and receives from the non-primary bus copy,
2. SIMPLEX specifying that the standby CP receives from the primary bus copy while the non-primary bus copy is not used,
3. MERGED specifying that the active CP sends on both bus copies and both the standby and active CP's receive from both bus copies (i.e., the return buses are merged), and
4. SIMPLEX-UPDATE specifying that the active CP sends on both bus copies to update the secondary memory copies but the standby CP receives from the primary bus copy only.

The duplex bus configuration is used when both CP's and all units on both buses are in-service. The simplex configuration is used when a unit on the secondary bus is out of service. The merged configuration is used when units on both the primary and secondary buses are out-of-service. The update configuration is used while updating an in-service unit on the secondary bus.

A diagnostic bus configuration is also available for IS* which is used in the diagnosis and recovery of IS*.

Maintenance Access Circuit (MAC)

Figure 12:
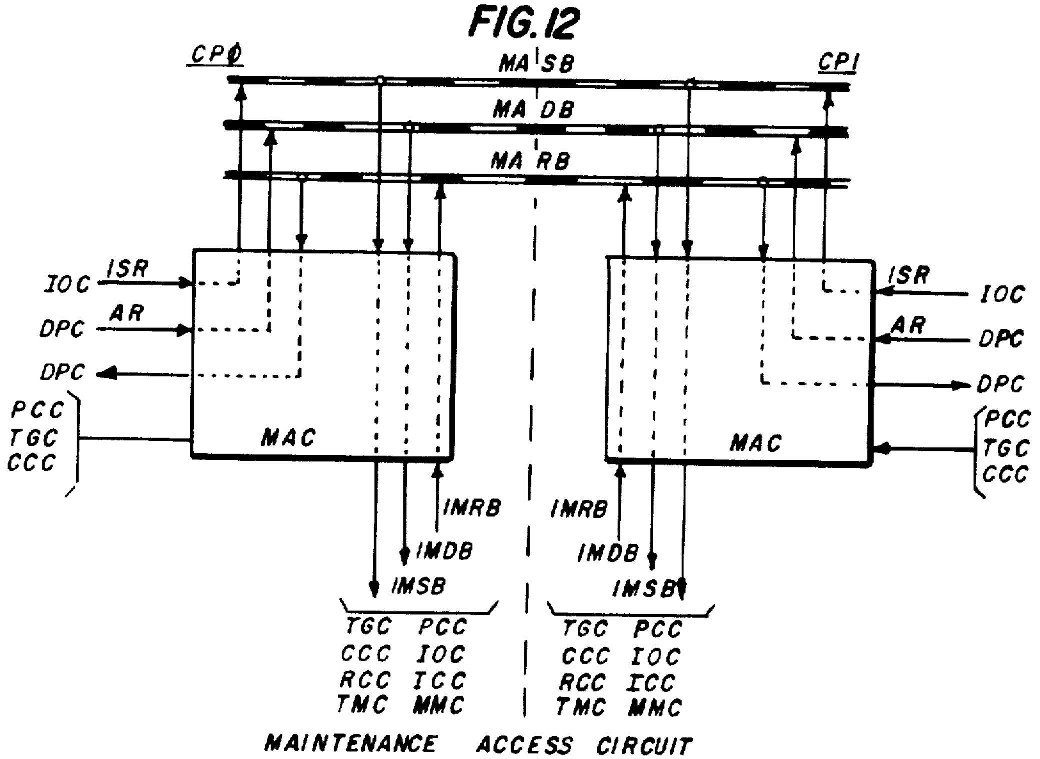
FIG. 12 is a functional block diagram of the Malfunction Monitor Circuit of the Central Processor.

The MAC 30 (FIG. 12) provides maintenance program access to the CP circuits. Read Maintenance Sense Group (RMSG) is an instruction which allows a group of 32 sense points from either the active or the standby CP to be read into a general register (GR1-GR2 of the Data Processor Circuit 23, see FIG. 5). Write Maintenance Control Group (WMCG) and Write Maintenance Control Point (WMCP) are instructions which respectively allow the program to write a group of 32 maintenance control points or a single control point in either the active CP, the standby CP, or both CPs. In this context, "writing" means that each maintenance control point sets or resets one or more flip-flops.

Although the instructions are decoded and controlled by the PCC, as explained more fully in the above-identified Brenski, et al., application Ser. No. 289,718, MAC selects the control groups, transmits write data from the DPC to the maintenance control groups selected, and reads maintenance sense groups returning data to the DPC.

Maintenance sense and control groups in either the active or standby CP are always selected by the MAC in the active CP only. Write data for maintenance control groups is also always taken only from the MAC in the active CP. In other words, only the MAC in the active CP can execute MAC instructions.

Power Monitor Circuit (PMC)

A Power Monitor and Control Circuit (PMC) (see FIG. 41) controls the actions necessary to turn power on or off from a CP or controls the actions necessary to remove power from a CP in which there is a defective power supply.

In case of trouble in a power supply of a CP copy, the PMC will remove all remaining power supplies from that copy.

When power is turned back onto the CP, the PMC will guarantee that the power can be turned on only to the standby CP while keeping the other CP active.

III. Recovery Control Circuit

The Recovery Control Circuit (RCC) 29 is the hardware part of a hardware-software emergency package. On indications that there are faults in the currently active CP [i.e. CP(A)] — primary IS combination, the RCC causes an interrupt into the System Recovery Program. If this program fails to pass certain checks, RCC forces a new CP-IS simplex combination and restarts the System Recovery Program. This is repeated until a CP(A), IS (primary) combination is found which does not exhibit errors or faults.

The RCC has to take action under failure conditions that are not covered by error signals from MMC 26. We can list two broad classes:

A. Failure conditions that affect equally both CMC copies
   Examples:
   1. Faults in TGC of CP(A). These may affect both CP's.
   2. Program faults that cause CP's to lose real-time control.

B. Failure conditions in the CP(A)-IS combination during execution of a recovery program. These programs are always entered with CP(S) i.e., the Standby Central Processor stopped. Their execution thus depends on fault-free operation of CP(A) and its primary IS, and has to be monitored by RCC.

The failure signals feeding into RCC are described below.

Before getting into the specific details of the RCC, a broader summary of its structure and operation will be made.

Duplication: There is one RCC in each CP and these are designated respectively 29 and 29*a* in FIG. 13.

States: An RCC can be in one of four states called S$\phi$, S1, S2, and S3.

Activity: An RCC is called active when it is executing an RCC-cycle; otherwise it is called dormant. Only the RCC in CP(A) can become active (initiate a RCC-cycle) in response to error signals. The RCC which initiates an RCC cycle remains in control during the entire cycle.

RCC Cycle: During an RCC Cycle, the active RCC:

1. assumes a new state; commands the other RCC to assume the same state,
2. sets up new CP(A)-IS combinations, if required,
3. generates and transmits a signal called RCEL to ICC (to start System Recovery Program), if required,
4. always starts recovery program timer 75 in the Timing Monitor Circuit 27 (FIG. 8), and
5. allows some 10 $\mu$ for restoration of CP error indicators before returning to dormancy.

When a CP status change takes place during an RCC cycle, it is executed before the end of this cycle. Thus, the active CP does not necessarily contain the active RCC.

Timing: Each RCC contains an internal timing generator taht produces the various timing pulses in an RCC cycle (RCC is independent of TGC 21).

Each of the RCC's 29, 29*a* of FIG. 2 includes: A control circuit designated 76 and 76*a* respectively; a timing generator circuit designated 77 and 77*a* respectively; and a state control circuit designated 78 and 78*a* respectively.

Figures 13, 14:
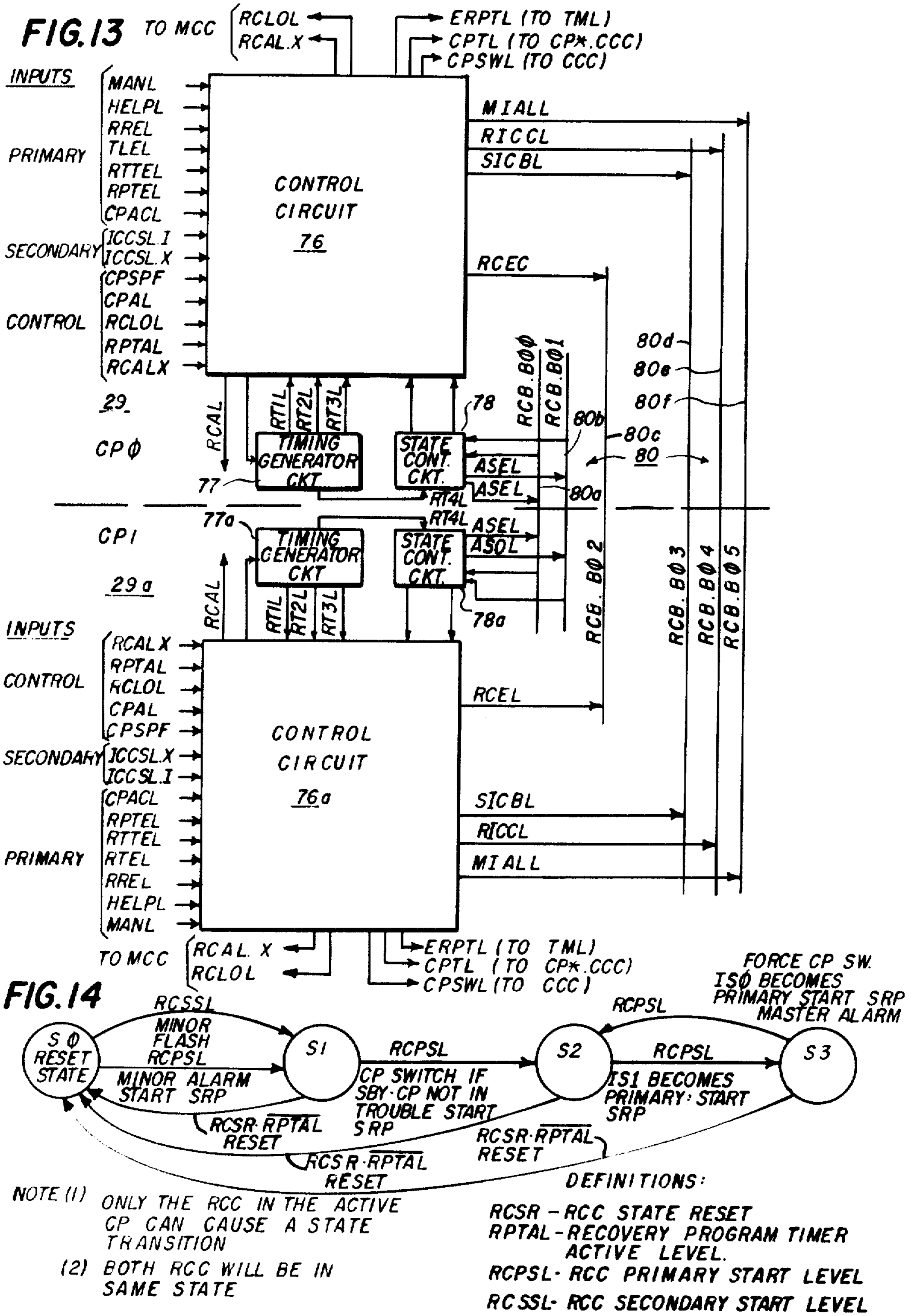
FIG. 13 is a functional block diagram of duplicate copies of the Recovery Control Circuit.
FIG. 14 is a diagrammatic showing of the various states that are assumed by the Recovery Control Circuit.

These inputs to RCC, as seen in FIG. 13, can be divided into three groups:

Primary Error Inputs

These are indications of malfunctions that require a transfer to the System Recovery Program and may require CP-IS reconfiguration. Primary error inputs are not cross-coupled between CP's.

1. MANL — Manual Level. Generated at Manual Control Console 20 (MCC) by maintenance man; causes an RCC cycle.
2. HELPL — Help Level. Generated by PCC 22 when a HELP instruction is decoded as indicated in the above-referenced Brenski, et al. application, Ser. No. 289,718. This provides a means to enter System Recovery Program under software control.
3. RREL — Repetition Rate Error Level. Generated by Timing Check Circuit 73 of TMC 27 (see FIG. 5) when timing levels are not received at proper rate.
4. TLEL — Timing Level Error Level. Generated by Timing Check Circuit 73 of TMC 27 when one or more timing levels are not received properly.
5. RTTEL — Real-Time Timer Error Level. Generated by DPC when Real-Time Timer (which is a counter) exceeds its maximum count because the program did not reset it in time. This is an indication that program has lost real-time control. The Real Time Timer is a part of the Special Register (SPR) included in the Storage Section 56 of the DPC (FIG. 5), as disclosed more fully in the referenced Brenski, et al application, Serial No. 289,718, the disclosure of which is also incorporated herein by reference.
6. RPTEL — Recovery Program Timer Error Level. Generated by Recovery Program Timer 75 of TMC when Recovery Program Timer is not punched properly by a recovery program.
7. CPACL — Central Processor Activity Change Level. Generated by TGC whenever status of CP changes. This change could of course have been provoked by RCC, (CPACL is ignored in this case) but the circuit considers the case that the change is caused elsewhere. In that case RCC has to initiate System Recovery Program.

Secondary Error Inputs

These inputs never cause the RCC to enter the System Recovery Program or to change the CP-IS configuration. Their purpose is to alert RCC that an interrupt to a recovery program is taking place.

1. ICCSL.I — Interrupt Control Circuit Sequence Level (see FIG. 9). Generated by ICC in the CP that houses RCC, whenever interrupt (caused by MMC 26, MCC 20, or RCC 29 itself) takes place.

2. ICCSL.X — Interrupt Control Circuit Sequence Level External. This signal is cross coupled from the other CP.

Control Inputs

The following control inputs affect RCC response to the primary and secondary error inputs described above.

1. CPAL — Central Processor Activity Level. Generated by CCC 25 of FIG. 11. CPAL = 1 indicates that the "home" CP is active (only RCC in CP(A) may initiate RCC cycle).
2. RPTAL — Recovery Program Timer Activity Level. Generated by Recovery Program Timer 75 of TMC when Recovery Program Timer 75 (FIG. 8) is timing a recovery program.
3. RCLOL — RCC Lockout Level. Generated by MCC 20 when a maintenance man disables RCC.
4. RCAL.X — RCC Activity Level External. Generated by RCC in other CP. RCAL = 1 when a RCC is active; it inhibits other RCC from becoming active.
5. CPSPF — CP Separate FF. Generated by CCC. When CPSPF = 1 the "home" CP is to ignore error indicators from other CP.

RCC State Sequences and Actions

Starting Conditions for RCC Cycle

An RCC can only become active in response to an error signal if all conditions below are fulfilled.

*a.* It is located in active CP (indication: CPAL = 1).

*b.* The maintenance man is not preempting RCC actions (indication: RCLOL — 0).

*c.* The RCC in either CP is not active (indication: RCAL.X = RCAL.I = 0).

We now define a primary RCC starting level RCPSL (caused by primary error inputs) and an RCC secondary starting level RCSSL (caused by secondary error inputs). Either level starts an RCC cycle, and they are stored in corresponding flip flops in the control circuitry 76, namely RCPSF and RCSSF (not shown).

$RCPSL = \overline{RCAL} \cdot CPAL \cdot \overline{RCLOL} \cdot \overline{RCAL.X}$ (MANL v HELPL v RREL v TLEL v RTTEL v RPTEL v CPACL).

$RCSSL = \overline{RCAL} \cdot CPAL \cdot \overline{RCLOL} \cdot \overline{RCAL.X}$ $(ICCSL.I \text{ v } \overline{CPSPF} \cdot ICCSL.X) \cdot S\phi$ As discussed below Sφ is a signal indication that the RCC is in state φ. An RCC cycle is started by triggering the timing generator circuit 77 into a timing cycle. It will be observed that both primary and secondary start levels are dependent on CPAL which is the signal indicative of which CP is active. Hence, only the RCC in the active CP can be triggered into an RCC cycle.

State Sequences

FIG. 14 shows the four RCC states (Sφ, S1, S2, S3). Possible transitions between states are shown by arrows. The condition for a transition is shown above the arrow and if this transition takes place during an RCC cycle the most important RCC actions are shown below the arrow.

Sφ is the reset or dormant state of an RCC. Note that transitions into Sφ do not involve an RCC cycle. RCC is reset by program control MAC produces the RCC reset level RCRSL. More details can be obtained from the copending, co-owned application of Schulte, et al, for "Maintanence Access Circuit for Central Processor of Digital Communication System,"filed Jan. 2, 1973, Ser. No. 320,020. Note also that the reset is executed only when the Recovery Program Timer is reset (RPTAL = 0). This is to prevent accidental resetting of RCC during execution of recovery programs monitored by the RPT. Normally all other transitions involve execution of an RCC cycle. (Note these transitions can also be caused under software control by MAC, in which case no RCC cycle is started).

Transitions from Sφ to S1 are caused by primary and secondary start levels. In both cases a minor alarm indicator at MCC 20 is set. Only primary start levels cause entrance into System Recovery Program (SRP). The secondary start level merely notifies RCC that a lower-priority Recovery Program is being started.

Transitions into S2 and S3 are caused by primary start level only. These transitions always cause entrance to SRP. In addition, they cause the following CP-IS reconfigurations.

S1 to S2: CP status switched provided that CP(S) does not have its Trouble Flip Flop CPTBF set.

S2 to S3: IS1 is forced to become primary IS.

S3 to S2: CP status switched, regardless CPTBF state of CP(S). ISφ is forced to become primary IS.

During this RCC cycle a major alarm is started at MCC.

The reconfiguration rules have been set up to minimize the number of RCC cycles/SRP attempts until a working CP-IS combination is found. It turns out that at most six attempts are necessary. As an example, assume:

CPφ is active CP

IS1 is primary IS.

A primary malfunction indication occurs because of simultaneously detected malfunctions in both CPφ and IS1.

| Attempt | RCC State Change | Active CP | Primary IS |
|---|---|---|---|
| 1 | SØ → S1 | CPØ | IS1 |
| 2 | S1 → S2 | CP1 | IS1 |
| 3 | S2 → S3 | CP1 | IS1 |
| 4 | S3 → S2 | CPØ | ISØ |
| 5 | S2 → S3 | CPØ | IS1 |
| 6 | S3 → S2 | CP1 | ISØ |

The number of RCC cycles required to reconfigure the CP*-IS* into a working system will be minimal if IS0 is defined to be the primary copy whenever possible.

Returning to the RCC block diagram of FIG. 13, all interconnections between the two RCC's 29 and **29*a*** and between the RCC's and other circuits are shown. Each RCC includes:

*a.* a control circuit, **76, 76*a***

*b.* a timing generator, **77, 77*a***, and

*c.* a state control circuit, **78, 78*a*** respectively.

A Recovery Control Bus (RCB) generally denoted 80 is used to transmit AC signals from the active RCC to circuits in both CP(CN) and IS*.Uφ. DC levels are used for signals which do not require cross coupling between CP's or have only one destination.

The control circuit 76 or 76a initiates a cycle by activating the timing generator 77 or 77a via either the primary (RCPSL) or further RCC actions (except the Enable Recovery Program Timer Level ERPTL, as will be described presently) are purely a function of RCC timing pulses and RCC state. The Timing Generator has control circuitry for determining the sequence and length of output signals. The RCC state defines which output signals are required to perform the reconfiguration.

The timing generator circuits 77, 77a may be constructed according to anyone of a number of conventional techniques. In one embodiment it includes a delay line which is pulsed at the beginning of an RCC cycle. The timing levels are picked off the appropriate distances along the line to generate delayed pulses; and the width of these pulses may be expanded or contracted with monostable circuits. See the above referenced Brenski, et al. application, Ser. No. 289,718, particularly FIG. 44 and accompanying text.

RCC Cycle Time

An RCC cycle is 10.0 to 10.5 $\mu$ sec. long, as seen in FIG. 15. This is sufficient to allow all malfunction detection circuits to reset in the active central processor following completion of reconfiguration actions. The longest reconfiguration sequency occurs as a result of a central processor switch. The cycle must be long enough to allow the repetition rate timer in the Timing Check Circuit 73 of TMC to reset after the active central processor starts executing the interrupt. The total RCC cycle time is the sum of:

*a*. 2.0 $\mu$ sec.; the time required by the RCC from the start of the cycle to completion of the CP switch function,

*b*. 6.0 $\mu$ sec.; the time required by the Timing Generator Circuit (TGC) to start the active central processor, and

*c*. 2.0 $\mu$ sec.; the time required, after the CP is started, to initialize the repetition rate timer.

Minimum RCC cycle time = 2.0 $\mu$ sec. + 6.0 $\mu$ sec. + 2.0 $\mu$ sec. = 10 $\mu$ sec.

Timing Within RCC Cycle

Within each cycle four sequencial stages of action occur in the RCC:

*a*. generation of appropriate configuration control signals as a function of existing RCC state,

*b*. generation of request for SRP interrupt if required,

*c*. advancing RCC to next state, and

*d*. guard period to allow CP malfunction detection circuits time to reset. Sequencing of these actions is accomplished by 5 timing pulses generated by the RCC clock. FIG. 15 shows the 5 pulses (RT1L through RT4L and RCAL), the length of each, and their placement in the RCC cycle.

RT1L and RT2L — used to generate configuration the control signals indicated in the drawing.

RT3L — used to generate request for SRP interrupt.

RT4L — used to generate advance state signals.

RCAL — RCC Activity Level.

FIG. 16 shows the RCC output signals required for each state transition initiated by an RCC cycle. The purpose and characteristics of each is given below:

ERPTL: Enable Recovery Program Timer

ERPTL = MANL + HELPL + RREL + TLEL + RTTEL + RPTEL + CPACL + ICCSL.I + ICCSL.X·CPSPF

This signal is generated whenever any one or more of the input error indicators is true.

Coupling: DC to TMC of home CP(CN).

Signal Length: Same as input signal (not less than 500 ns.)

RCAL: RCC Activity Level; RCAL in one CP becomes RCAL.X in the other CP.

This signal is true whenever the RCC IS active; i.e., a cycle is in process.

Coupling: DC to opposite CP(CN).

Signal Length: Same as RCC cycle time (Minimum of 10 $\mu$ sec., see FIG. 15)

Function: Disable RCC in other CP(CN) during RCC cycle.

RCEL: Recovery Control Error Level

RCEL = RT3L·RCPSF where RCPSF is true whenever an RCC cycle is initiated by RCPSL as defined above.

Function: Upon receiving RCEL the ICC will generate an interrupt to SRP.

Coupling: AC to CP*.ICC via RCB.B$\phi$2 (to ICC's in both CP's).

Signal Length: 1$\mu$.

Placement: RCEL cannot be generated until all configuration commands have been issued and have had time to stabilize. Therefore, RCEL is generated 2.0 $\mu$ sec. after start of cycle (see CPSWL below).

CPSWL: CP Switch Level

CPSWL = RT2L·(S1 v S3).

Function: The active CP will become standby and standby will become active if the standby CP trouble FF is not set.

Coupling: DC to CCC of home CP.

Signal Length: 1 $\mu$ minimum.

Note: The minimum signal length is a function of the number of gates in series in each leg of the CPAUF which is disclosed below. The reconfiguration time is twice CPAUF switch time (2$\mu$ ). This allows for relapse in case the CP trouble FF is set in the standby.

Placement: CPSWL is generated at start of cycle.

CPTL: CP Trouble Level

CPTL = RT1L·S3.

Function: Set the CP trouble FF in home CP, reset CP trouble FF in other CP, and reset Instruction Store Copy Bus FF in both CP(CN).

Coupling: AC to CP*.CCC.

Signal Length: 500 $\mu$ sec.

Placement: At start of cycle.

SICBL: Set Instruction Store Copy Bus Level

SICBL = RT1L·S2.

Function: Set the Instruction Store Copy Bus FF in CP*.CCC.

Coupling: AC to CP*.CCC via RCB.B$\phi$3.

Signal Length: 500 $\mu$ sec.

Placement: At start of cycle.

RICCL: RCC Instruction Store Configuration Control Level

RICCL = RT1L·(S2 v S3)
Function: Reset ISBF, set ISTBF and reset ISDBF instruction store bus configuration FF's. Also resets TBF in both IS(CN).Uϕ
Coupling: AC to CP*.CCC and IS*.Uϕ via RCB.Bϕ4.

Signal Length: 500 μ sec.
Placement: At start of cycle.

MIALL: Minor Alarm Level
MIALL = RT1L·Sϕ.
Function: Set minor alarm FF in manual control console.
Coupling: AC to MCC via RCB.Bϕ5.
Signal Length: 500 μ sec.
Placement: At start of cycle MAALL: Major Alarm Level
MAALL = RT1L·S3.
Function: Set major alarm FF for home CP in manual control console.
Coupling: DC to MCC.
Signal Length: 500 μ sec.
Placement: At start of cycle.

ASEL: Advance State Even Level
ASEL = RT4L·(Sϕ v S2).
Function: Cause state counter to advance in both RCC's from S1 or S3 to S1.
Coupling: AC to CP*.RCC via RCB.Bϕ1.
Signal Length: 500 μ sec.
Placement: Any time after RT3L.

In the above, Sϕ, S1, S2 and S3 are signals representative of the RCC's being in those respective states. The generation of the signals is shown in FIG. 17 and will be better understood presently.

State Control

Figure 17:
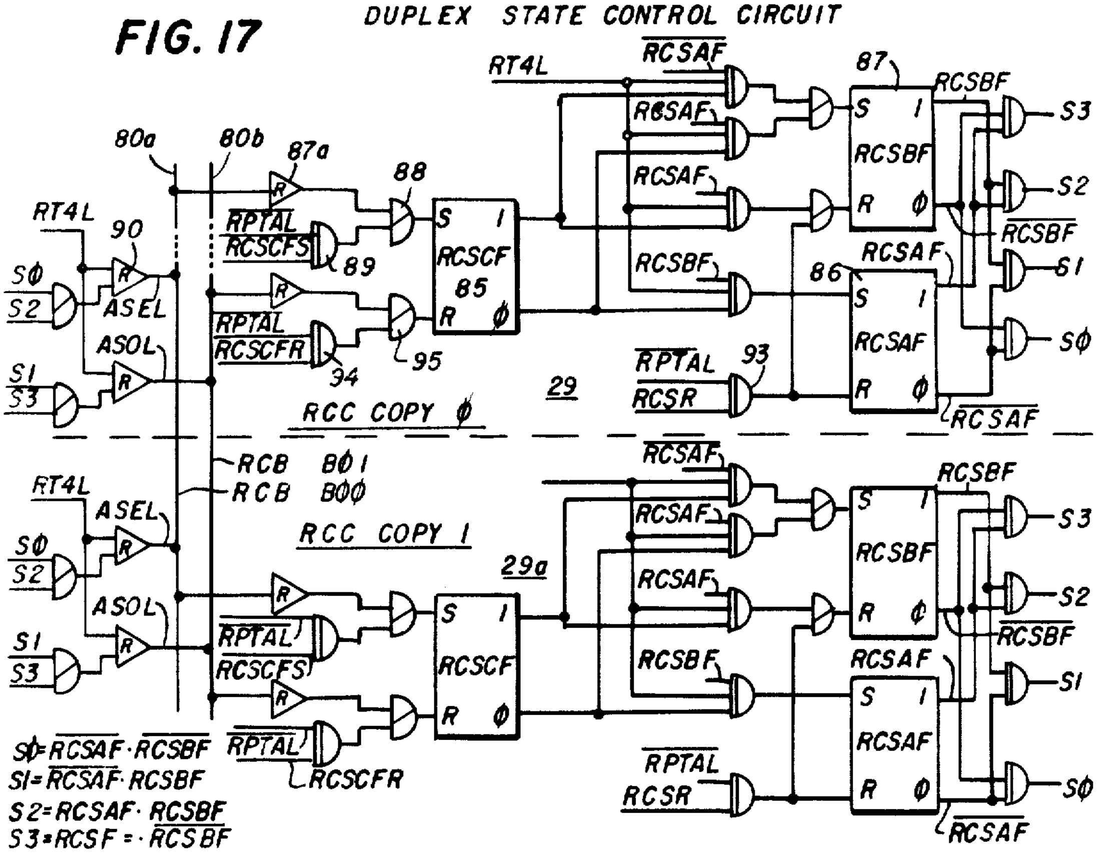
FIG. 17 is a block diagram of the duplex state control circuitry.
Figure 18:
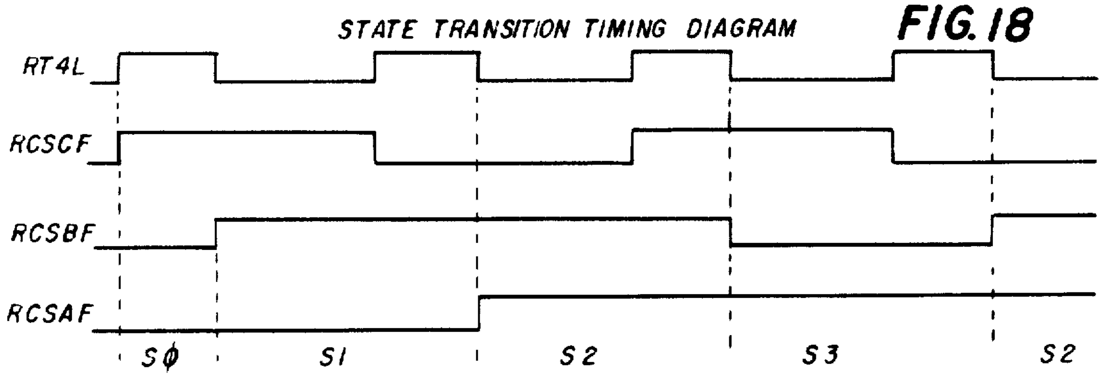
FIG. 18 is a timing diagram and sequence diagram for the state control circuitry of FIG. 17.

The state control circuit 78, 78a is shown in FIG. 17. FIG. 18 shows the state control timing and the state transition table. The primary functions of the state control circuit are to determine which states both RCC's 29 and 29a should be in, and to indicate which state they are in fact in.

Before turning to the detailed showing of FIG. 17, FIG. 13 shows b 6 bits, Bϕϕ–Bϕ5 of the Recovery Control Bus (RCB) 80, and these are designated respectively 80a–80f. Lines 80a, 80b representing respectively bits Bϕϕ and Bϕ1 communicate the state control ciruits 78, 78a in the two copies of the RCC. Bit Bϕϕ carries the ASEL signal, and bit Bϕ1 carries the ASOL signal. ASEL stands for Advance State Even Level, and ASOL stands for Advance State Odd Level. These signals are AC pulses and they are cross coupled to both RCC copies as indicated. Only the RCC in the active CP may initiate an RCC cycle; therefore only one RCC State Control Circuit 78, 78a will receive timing level RT4L which is necessary to produce the signals ASEL and ASOL, as will be explained presently. Recovery Control Bus bits ϕ3, ϕ4 and ϕ5 are coupled between both RCC copies and carry the following signals respectively: SICBL, RICCL, and MIALL. It will be observed that RCB, Bϕ4 (RICCL) is fed directly to the Instruction Stores to set the TDF and TBF flip-flops, as will be discussed.

Turning then to FIG. 17, the state control circuit 29a is similar to the state control circuit 29, and only the latter need be described in detail in order to understand the invention completely. The state control circuit 29 includes a Reconfiguration State Control Flip-Flop C (denoted 85 and sometimes referred to as RCSCF; a REconfiguration State Control Flip-Flop A (denoted 86 and sometimes referred to as RCSAF); and a Reconfiguration State Control Flip-Flop B (denoted 87 and sometimes referred to as RCSBF).

In the drawing, the circuit indicated by the symbol 87 is a cable receiver, the circuit indicated by the symbol 88 is an OR gate; the circuit indicated by the symbol 89 is an AND gate; and the circuit indicated by the symbol 90 is a cable driver (both inputs of which must be pulsed in order to obtain an output). As indicated, the signals ASEL and ASOL are generated respectively on the lines 80a and 80b at the time RT4L dependent upon whether the CP is in an even state (Sϕ or S2) or an odd state (S1 or S3).

The flip-flops 86, 87 indicate which state the RCC is in, and the AND gates responsive to the outputs of these filp-flops generate the levels Sϕ–S3, as illustrated.

The Reconfiguration State Control Flip-flop C 85 in both RCC copies responds to the signals ASEL and ASOL—ASEL causes the flip-flop 85 to be set when RT4L is pulsed, and ASOL causes it to be reset. When RT4L ends, the state indicating flip-flops 86, 87 will assume the next sequential state (see timing diagram and chart of FIG. 18). That is, these latter flip-flops are arranged as a counter, counting sequentially through the various states that the RCC may assume, as disclosed above.

It is an important feature of the circuitry shown in FIG. 17 that an inactive RCC, if activated, will eventually achieve synchronous operation with and be controlled by the RCC in the active CP. This is due to the logic circuitry shown and the separation of control pulses into the even and odd levels, as described. For example, if the inactive RCC is in S2 and the active is in S1 or S3, the inactive RCC will not even respond to RT4L since an RSEL level will be generated, and the RCSFCF is already in the ONE state. The input logic circuitry to flip-flops 86 and 87 will prevent their response until synchronization is eventually attained.

All three flip-flops in the state control circuit can be software controlled via the Maintenance Access Circuit (MAC). The RCSCF can be set (signal RCSCFS), reset (signal RCSCFR), and sensed via MAC (level RCSR). Note, however, that the MAC set and reset commands will have no effect if the recovery program timer 75 of the TMC 27 (FIG. 8) is active ($\overline{RPTAL}$ = 1) since the AND gate 93 is enabled only by $\overline{RPTAL}$. In other words, if a recovery program is being run, MAC cannot reset the RCC to State ϕ. The location of the MAC control and sense points associated with the RCC are shown in FIGS. 19 and 20.

Because an RCC cycle only occurs as a result of a malfunction, no definite statements can be made about the CP status at the start of the recovery program. A few general comments follow:

CP general registers; the contents are not directly affected by RCC, or ICC.

The standby CP is stopped (by the ICC).

All error cross coupling is disabled (by CCC and MMC).

No bus configurations are modified except where explicitly defined by RCC state transition.

The address + 1 or address + 2 of the instruction being executed at time of malfunction or RCC cycle is stored in match register $\phi$ (by ICC and MMC) so that the program can return.

Only the RCC state control circuit **78, 78*a*** can be accessed directly by program. Access is provided via the Maintenance Access Circuit (MAC). The following maintenance access control points are provided.

*a.* RCSCFS: Reconfiguration State Control Flip-Flop Set

This control point will set the RCSCF to 1. If the recovery program timer is active, the control point will have no effect on RCSCF (see gate 89).

*b.* RCSCFR: Reconfiguration State Control Flip-Flop Reset

This control point will reset the RCSCF to 0 via AND gate 94 (also receiving $\overline{\text{RPTAL}}$) and OR gate 95.

*c.* RCSR: RCC State Reset

This control point will reset state control section flip-flops RCSAF and RCSBF along with the RCC Primary Start Flip-flop (RCPSF) which is included in the control circuit 76 and generates the RCPSL start signal.

FIG. 19 shows the RCC control point layout in Maintenance Control Group -8. If the recovery program timer is active (RPTAL=1), all of the above control points are disabled.

Four maintenance access sense points are provided.

*a.* RCSAF: RCC State A Flip-Flop
*b.* RCSBF: RCC State B Flip-Flop
*c.* RCSCF: RCC State Control Flip-Flop
*d.* RCPSF: RCC Primary Start FF.

The layout of these points are shown in FIG. 20.

Before returning to call processing, the recovery programs must reset the RCC to its normal state S$\phi$. First RCSCF must be reset via MAC control point RCSCFR (MCG-8,B$\phi$2). Following this, all other RCC FF's can be reset via MAC control point RCSR (MCG-8.B$\phi\phi$).

The reset function of both RCSCF and RCSR is disabled if the recovery program timer is not reset.

The above two part sequence will cause the RCC state counter to go to S$\phi$ from all other RCC states S1, S2, and S3.

The execution of a HELP instruction (see FIG. 81 of above-identified Brenski, et al. aPplication Ser. No. 289,718) causes the RCC to immediately go through a reconfiguration cycle whenever the RCC is in states S1, S2 or S3. This feature is provided so that an RCC trigger can be generated by the program whenever it leaves the normal path in a recovery program. For example, if a recovery program contains a decision transfer instruction where the outcome of the decision should always be true, the transfer should be followed by a HELP instruction. Thus, if the CP fails to make the transfer a RCC trigger is generated.

Program Monitoring

Program Monitoring During Normal Operation

As mentioned above and more fully disclosed in the Brenski, et al. application Ser. No. 289,718 incorporated herein by reference, the Data Processing Circuit 23 (FIG. 5) contains the Real-Time Timer as a part of the Special Register SPR which is a continuously running counter. The counter is incremented once during each CP cycle time (4$\mu$ Sec.). The programs must continually reset the counter such that the count never exceeds 16383 cycles. If the count is allowed to reach 16384 an RCC trigger (RTTEL) is generated and a reconfiguration cycle will result.

Program Monitoring During Recovery

In addition to the Real-Time Timer, the Recovery Program Timer 75 of TMC (FIG. 8) is also employed during the execution of the recovery program. This timer requires that the recovery program "punch in" every 128 instructions. If the program punches in either early or late, an RCC trigger (RPTEL) is generated. The Recovery Program Timer also has a special mode of operation which allows operation similar to that of the Real-Time Timer; the program must "punch in" such that the count never exceeds 127 cycles.

Input Summary

| SOURCE | MNEMONIC | NAME |
|---|---|---|
| TMC | RREL | Repetition Rate Error Level<br>The Repetition Rate Error Level becomes true if a selected timing level in the TGC circuit does not occur every 4$\mu$ seconds.<br>Signal Characteristics:<br>Coupling: DC Coupled.<br>Signal Duration: Until timing level starts again. |

| SOURCE | MNEMONIC | NAME |
|---|---|---|
| TMC | TLEL | Timing Level Error Level<br>This signal to RCC is true if any timing level is missing or occurs in the wrong time.<br>Signal Characteristics:<br>Coupling: DC Coupled.<br>Signal Duration: 500 nanoseconds. |
| DPC | RTTEL | Real Time Timer Error Level<br>The Real Time Timer counts the number of Basic Order Cycles (BOT) executed by the Processor (A BOT is 4 microseconds). The program timer will provide a true level when the count reaches 16284, approximately 65 milliseconds, unless it is reset anytime prior to this by the program. It's function as an RCC input is to keep a gross check on program execution. It makes the RCC take action if the program should get lost or enter endless loops, and thus lose its call processing ability.<br>Signal Characteristics:<br>Coupling: DC Coupled.<br>Signal Duration: 3.5 – 4.0$\mu$ seconds. |
| TMC | RPTEL | Recovery Program Timer Error Level<br>The Recovery Program Timer counts BOT's and will provide a true level when the count reaches binary 128 or if the timer is reset at anytime other than when the count is binary 127, unless the Recovery Timer is in its special mode.<br>Its function as an RCC input is to keep a stringent running time check on all fault recovery programs. It makes the RCC take action if fault recovery programs run amuck due to a fault.<br>Signal Characteristics:<br>Coupling: DC Coupled.<br>Signal Duration: Until reset by ICC. |

| SOURCE | MNEMONIC | NAME |
|---|---|---|
| TGC | CPACL | Central Processor Activity Change Level<br>The CPACL level is true whenever the central processor's change their active standby status. It principal function as an input to the RCC is to cause the RCC to generate a interrupt command to the ICC circuit whenever the CP's switch. |

-Continued

Input Summary

| SOURCE | MNE-MONIC | NAME |
|---|---|---|
| | | Signal Characteristics: Coupling: DC Coupled. Signal Duration: Approximately 1.5μ seconds. |
| PCC | HELPL | Help Instruction Level<br>A true input is provided whenever the instruction decoder decodes a HELP instruction in the program. Its function as an input to the RCC is to provide a means for the program to initate an RCC cycle.<br>Signal Characteristics:<br>Coupling: DC Coupled.<br>Signal Duration: Approximately 3.5μ seconds. |

| SOURCE | MNE-MONIC | NAME |
|---|---|---|
| MCC.MCSP | MANL | Manual Interrupt Level<br>A true input is provided whenever the button requesting an RCC Cycle from the maintenance console is depressed.<br>Its function as an RCC input is to allow the maintenance man to initiate RCC action when it is required.<br>Signal Characteristics:<br>Coupling: AC Coupled.<br>Signal Duration: 1μ second. |
| ICC | ICCSL.I | Interrupt Control Circuit Sequence Level.Interval<br>The ICCSL.I level is generated whenever the interrupt circuit in same CP(CN) generates an interrupt of any priority. Its function as an RCC input is to inform the RCC that ICC is taking action and that the RCC should start the recovery program timer and advance its self to state S1 but take no other action. ICCSL.I is effective in the RCC only if RCC is in S0 the reset state.<br>Signal Characteristics:<br>Coupling: DC Coupled.<br>Signal Duration: Approximately 3μ seconds. |
| ICC | ICCSL.X | Interrupt Control Circuit Sequence Level<br>This is the same as ICCSL.I except it is generated by the opposite CP(CN). |
| CCC | CPAL | Central Processor Activity Level<br>This level when true signifies that the RCC in which it is connected is the active RCC. |

| SOURCE | MNE-MONIC | NAME |
|---|---|---|
| RCC.X | RCAL.X | RCC Activity Level External<br>This level is generated by the external RCC circuit when it is active and performing a RCC cycle. Its function in the internal RCC circuit is to prevent the internal RCC from accepting principle inputs during the transition of the internal RCC from a standby to active status, during an external RCC initiated CP switch.<br>This level is necessary to allow the initiating RCC to complete all RCC actions. RCAL eliminates timing synchronism problems between RCC's and simplifies gating. |
| RCB.B00 | ASEL | Advance State Even Level<br>This level is generated by the active RCC to step the state counter in both RCC's.<br>Its function as an RCC input is to keep the states of the RCC's in synchronism. |
| RCB.B01 | ASOL | Advance State Odd Level<br>Same as ASEL. |
| IMDB.nn | | Internal Maintenance Data Bus |
| IMDB.B00 | RCSR | RCC State Reset Command<br>This level is a general reset signal to the RCC.<br>Signal Characteristics:<br>Coupling: DC Coupled.<br>Signal Duration: 500μ seconds. |

-Continued

Input Summary

| SOURCE | MNE-MONIC | NAME |
|---|---|---|
| IMDB.B01<br>IMDB.B02 | RCSCFS<br>RCSCFR | These levels allow the program to advance the RCC state counter. |
| IMDB.B03 | RCTGDS | Start SBY RCC delay line; for diagnostic use only. |
| MCC.MCSP | RCLOL | RCC Lockout Level<br>This level is generated by the maintenance control console and allows the maintenance man to disable all RCC action when he wishes to select a configuration manually.<br>Signal Characteristics:<br>Coupling: DC Coupled.<br>Signal Duration: Duration switch generated. |
| CCC | CPSPF | Central Processor Separate Flip-Flop<br>The level inhibits all inter CP error level communication. Its purpose in the RCC is to inhibit reception of ICCSL.X when CPSPF is true.<br>Signal Characteristics:<br>Coupling: DC Coupled |
| TMC | RPTAF | Recovery Program Timer Active Flip-Flop<br>This level from the TMC indicates that the cycle timer is running. Its function in the RCC is to prevent the RCC from being reset to the idle state and to prevent MAC routining of the State Counter when the timer is running.<br>Signal Characteristics:<br>Coupling: DC Coupled.<br>Signal Duration: Approximate duration as long as timer is running. |

Output Summary

| DESTINATION | MNE-MONIC | NAME |
|---|---|---|
| CP*.RCC | RCAL | RCC Activity Level<br>This level is generated when the active RCC enters its cycle and remains up until it finishes its cycle. It serves to keep the other RCC deactivated until the cycle is complete and this guards against the other RCC taking over in the event of a CP switch caused by the active RCC.<br>Signal Characteristics:<br>Coupling: DC Coupled<br>Signal Duration: Approximately 10μ seconds. |
| RCB.B00 | ASEL | Advance State Even Level<br>This level is generated by the RCC during its cycle to advance the RCC state counters to their next state. The active RCC advances the state of both its self and the standby RCC.<br>Signal Characteristics<br>Coupling: AC Coupled.<br>Signal Duration: 500 nanoseconds. |
| RCB.B01 | ASOL | Advance State Odd Level<br>Same as ASEL. |
| TMC | ERPTL | Enable Recovery Program Timer Level<br>This signal is generated by the RCC for any principle input being true irrespective of whether the RCC is the active RCC or the standby RCC.<br>ERPTL is coupled only to the internal TMC.<br>Signal Characteristics:<br>Coupling: DC Coupled<br>Signal Duration: This signal is generated directly from the principle inputs and as such depends on the length of the input. The minimum length is 500 nano-seconds the maximum is undefined. |

-Continued

Output Summary

| DESTINATION | MNEMONIC | NAME |
| --- | --- | --- |
| RCB.B02 | RCEL | Recovery Control Error Level<br>This level to the ICC circuit is generated by the RCC when a interrupt to System Recovery Program is required.<br>Signal Characteristics:<br>Coupling: AC Coupled.<br>Signal Duration: 1μ second. |
| RCB.B03 | SICBL | Set Instruction Store Copy Bus Level<br>This level selects Instruction Store Bus 1 to be the primary bus.<br>SIBL is coupled to the CCC circuits in both the active and the standby CP's via RCB Reconfiguration Bus.<br>Signal Characteristics:<br>Coupling: AC Coupled.<br>Signal Duration: 500 nanoseconds |
| CP*.CCC | CPTL | Central Processor Trouble Level<br>This level sets the CP trouble flip-flop in same CP (CN) as the RCC, resets the CP trouble F/F in opposite CP (CN), and selects Instruction Store Bus 0 to be primary bus.<br>Signal Characteristics:<br>Coupling: AC Coupled.<br>Signal Duration: 500 nanoseconds. |

| DESTINATION | MNEMONIC | NAME |
| --- | --- | --- |
| RCB.B04 | RICCL | RCC Instruction Store Configuration Control Level<br>This level resets the trouble flip-flops in IS*.U0, resets the ISBBF in both CP (CN), sets the ISTBF in both CP (CN) and resets the ISDBF in both CP (CN).<br>Signal Characteristics:<br>Coupling: AC Coupled.<br>Signal Duration: 500 nanoseconds. |
| CCC | CPSWL | Central Processor Switch Level<br>This level causes the active and standby Central Processors to switch if the standby Central Processor is not marked in trouble.<br>CPSWL is coupled only to the internal CCC.<br>Signal Characteristics:<br>Coupling: DC Coupled.<br>Signal Duration: 1μ second. |
| RCB.B05 | MIALL | MInor ALarm Level<br>This level is provided to the CAM whenever the RCC advances out of the reset state.<br>Signal Characteristics:<br>Coupling: AC Coupled.<br>Signal Duration: 500 nanoseconds. |

| DESTINATION | MNEMONIC | NAME |
| --- | --- | --- |
| IMRB.B01 | RCSAF | RCC State A Flip-Flop |
| IMRB.B02 | RCSBF | RCC State B Flip-Flop |
| IMRB.B00 | RCSCF | RCC State Control Flip-Flop |
| IMRB.B03<br>MCC.MCP (CN)<br>CAM | RCPSF | RCC Primary Start Flip-Flop<br>These flip-flops are sense points to the Central Processor to enable it to view the states of the RCC State Sequence Counter and the Primary Start Flip-Flop of the RCC.<br>Signal Characteristics:<br>Coupling: DC Coupled.<br>Signal Duration: The State Sequence Counter will provide a steady level unless it is viewed during a RCC cycle. |
| MCC.MCP (CN) | RCAL.X | RCC Activity Level External<br>The RCAL.X signal that is received from other RCC is wired to a lamp on MCC. |

-Continued

Output Summary

| | | |
| --- | --- | --- |
| MCC.MCP (CN) | CLOL | RCC Lockout Level<br>The RCLOL signal that is received from the MCC is returned to the MCC and displayed in a lamp |

IV. Configuration Control Circuit

The Configuration Control Circuit (CCC) (blocks 25 in FIGS. 1 & 2 and seen in FIG. 11) contains thirteen flip-flops which statically define the configuration that exists in the control and Maintenance Complex (CMC) communication channels. These thirteen flip-flops are separated into four groups with respect to function they perform. The four functions are to:

*a.* Indicate the status of the Central Processors (CP's) and cross coupling.

*b.* Indicate the bus configuration between the CP's and the Instruction Store Complex (IS*).

*c.* Indicate the bus configuration between the CP's and the Process Store Complex (PS*).

*d.* Indicate the bus configuration between the CP's and the Peripheral Unit Complex (PU*).

CCC flip-flops can be altered by one (and for certain flip-flops by all) of the following three ways:

1. Program Control (via Maintenance Access Circuit "MAC").
2. Hardware Control (via Recovery Control Circuit "RCC").
3. Maintenance Personnel Control (via Manual Control Console "MCC").

The nomenclature used is the same as used in the above-identified Brenski, et al. application Ser. No. 289,718. The CCC will be disclosed herein only to the extent necessary to understand how it generates signals to the IOC to set up the various IS, CP combinations called for by the previously described RCC.

The Configuration Control Circuit is organized into four sections: The CP Status Group, the CP-IS Bus Configuration Group, the CP-PS Bus Configuration Group, and the CP-PU Bus Configuration Group.

CP Status Group

The Central Processor Status Group (see FIG. 21) contains four flip-flops and a CP copy identification level:

1. Central Processor Active Unit Flip-Flop 100 (CPAUF)

This flip-flop specifies whether the CP in which it resides is the active or the standby copy. The CPAUF is actually implemented as one flip-flop with one half in each CP copy, as will be described in connection with FIG. 41. This insures that a standby-standby condition will not exist between the two CP copies. Also if power is removed from the active copy the standby CP automatically becomes the active copy.

2. Central Processor Trouble Flip-Flop 101 (CPTBF)

The CPTBF when set, indicates that the CP copy in which it resides is marked in trouble. The functions of this flip-flop are to inhibit the CP from sending to the IS, PS and PU complexes and to cause the other CP to become the active unit.

3. Central Processor Separate Flip-Flop 102 (CPSPF)
When this flip-flop is set: *a*) it inhibits the Malfunction Monitor Circuit (MMC) error levels from being sent to the other CP; *b*) inhibits the reception of the error signals generated and transmitted by the other CP; and *c*) inhibits reception of ICCSL.X at the RCC. When reset, it provides a reset command to the Diagnostic Flip-Flop 103 (DF).
4. Diagnostic Flip-Flop 103 (DF)
This flip-flop provides the means for diagnosing the send and receive bus level circuitry within the CC of the standby CP which is developed, in part, with the function "DCPAL." Without the DF flip-flop the function "DCPAL" could never be "true" in the standby CP thereby making it impossible to diagnose standby CP circuitry composed with the "DCPAL" function.
The DF may be set (via MAC) in either CP only if the CPSPF flip-flop in the respective CP is set, since the CPSPF, when reset provides a constant reset command to the DF. DF's becoming set in the active CP has no effect.
5. Central Processor Copy Level 104 (CPCL)
The program normally refers to a CP copy as active or standby but during diagnostics the copy ($\phi$ or 1) identity of the active unit is required in order to notify the maintenance personnel as to which CP copy is faulty.

CP-IS Bus Configuration Group

CP-IS Bus Configuration Group, generally indicated by the block 105 in FIG. 21 contains four flip-flops which indicate the 24 possible CP-IS bus configurations (12 with CP$\phi$ active, 12 with CP1 active). The instruction Store Bus Control Flip-Flops in both CP copies are normally in identical set or reset states and should be altered by their set or reset commands through MAC simultaneously. The four flip-flops are:

1. Instruction Store Copy Bus Flip-Flop (ISCBF)
When ISCBF = 1:
defines IS1.Bus System (IS1.BS) as the primary bus which the active CP is to communicate on.
When ISCBF = $\phi$:
defines IS$\phi$.BS as the primary bus which the active CP is to communicate on.
2. Instruction Store Both Buses Flip-Flop (ISBBF)
When ISBBF = 1:
*a*. active CP sends on both IS buses.
*b*. both CP's receive from both IS buses (except when ISTBF = 1, see 3).
3. Instruction Store Trouble Bus Flip-Flop (ISTBF)
When ISTBF = 1:
both CP's receive from primary IS bus only.
4. Instruction Store Data Bus Flip-Flop (ISDBF)
ISDBF only has significance when ISTBF = 1 and only effects data being sent to the IS* during the first cycle of write instructions and data being received from IS* during the first cycle of read instructions. ISDBF provides a useful tool for diagnostics of a standby IS unit.
When ISDBF = 1:
*a*. both CP's receive data from secondary bus.
*b*. active CP sends data on secondary bus.
When ISDBF = $\phi$:
*a*. both CP's receive data on primary bus.
*b*. active CP sends data on primary bus.

| SOURCE | MNEMONIC | DESCRIPTION |
|---|---|---|
| RCC | CPSWL | CP Switch Level (Reset CPAUF) |
| | CPTL.I | CP Trouble Level Internal (Set CPTBF and reset ISCBF) |
| RCC.X | CPTL.X | CP Trouble Level External (RESET CPTBF and ISCBF) |
| RCB | RCB.B03 (SICBL) | RCC Bus, bit 03 (Set ISCBF Level) |
| | RCB.B04 (RICCL) | RCC Bus, bit 04 (RCC-IS Configuration Control Level, initiates reset of ISBBF and ISDBF, also the set of ISTBF) |
| CCC.X | CPAL.X | CP Activity Level External (integral part of CPAUF) |
| PMC.X | CPTBL.X-ST | CPTBF Level External-Signal Transmission (Functional part of reset commands and also a set command for CPAUF; reset command for CPTBF) |
| | CPTBL.X-GT | CPTBF Level External-Ground Transmission (Twisted pair ground of CPTBL.X-ST) |
| ICC | ICCSL | ICC Sequence Level (Part of set command for CPSPF) |
| MCC.SP | MSICL | MCC Set ISCBF F/F Level |
| | MSIBL | MCC Set ISBBF F/F Level |
| | MRIBL | MCC Reset ISBBF F/F Level |
| | MSITL | MCC Set ISTBF F/F Level |
| | MRITL | MCC Reset ISTBF F/F Level |
| | MRIDL | MCC Reset ISDBF F/F Level |
| | MSAL | MCC Set Active Level (Set CP Active Unit Flip-Flop and Reset CP Trouble Flip-Flop) |
| | MSSL | MCC Set Standby Level (Set CPTBF) |
| PCC | DCCAF | Dual Cycle Control A F/F (indicates time interval T2 of first cycle through T2 of second cycle of the dual cycle instructions: RIS, WIS, WISN, RISN, RISA, WISD, RIST, XEC and XECN). |
| TGC | T0AL | Timing Interval 0 Accept Level (used for the set or reset of the second stage of the Dual Rank ISCBF, ISBBF and ISTBF flip-flops. |
| | T3AL | Timing Interval 3 Accept Level (specifies when the CPSPF F/F may set as a function of the ICCSL input being true). |
| MAC | IMSB.B26 .B29 | Internal Maintenance Select Bus Bits 26 and 29 — selects CCC flip-flops for status read-out (RMSG instruction) or status control (WMCP and WMCG instructions). |
| | IMDB.B00–B12 B16–B28 | Internal Maintenance Data Bus. Bits 0 through 12, and 16 through 28 — this data bus provides the control bits that specify set or reset of CCC flip-flops during the execution of a WMCP or WMCG instruction. For MCG-6, Bit 00 sets ISCBF, Bit 01 sets ISBBF, Bit 02 sets ISTBF, Bit 03 sets ISDBF; Bits 10–12 set respectively CPTBF, CPSPF and DF; Bits 16–19 reset respectively ISCBF, ISBBF, ISTBF and IBDBF; and Bits 26–28 reset respectively CPTBF, CPSPF and DF. |

| USER | MNEMONIC | DESCRIPTION |
|---|---|---|
| RCC | CPAL | Central Processor Activity Level (Central Processor Active Unit Flip-Flop Output) |
| | CPSPF | CP Separate Flip-Flop (CPSPF F/F Output Level) |
| TGC | CPAL | Central Processor Activity Level (Central Processor Active Unit Flip-Flop Output) |
| MMC | CPSPF | CP Separate Flip-Flop (CPSPF F/F Output Level) |
| | ISDBL | Instruction Store Data Bus Level — (Represents condition of ISTBF and ISDBF flip-flops are set). Inhibits IS Error Level generation within the MMC during IS* data fetch operations. |
| CCC.X | CPAL | Central Processor Activity Level Integral part of CPAUF F/F) |
| PMC | CPTBF-ST | Central Processor Trouble F/F-Signal Transmission (Used for Reset of CPTBF and set or reset of CPAUF in CCC.X) routed through power "ON" switch in PMC. |
| | CPTBF-GT | CPTBF-Ground Transmission (Twisted Pair ground of CPTBF-ST) |

-Continued

| SOURCE | MNEMONIC | DESCRIPTION |
|---|---|---|
| IOC | CPTBF | Central Processor Trouble Flip-Flop —This level, when true, will inhibit the CP from sending to the IS,PS and PU complexes. |
| | CPAL | Central Processor Activity Level |
| | SISB0L | Send Instruction Store Bus 0 Level |
| IOC | SISB1L | Send Instruction Store Bus 1 Level |
| | RISB0L | Receive Instruction Store Bus 0 Level |
| | RISB1L | Receive Instruction Store Bus 1 Level |
| MAC | IMRB.B00–B13 | Internal Maintenance Return Bus, Bits 0 through 13 — the CCC sense points selected by the IMSB.XX signals are gated onto this bus during the execution of a RMSG instruction. Bits 00–03 sense respectively ISCBF, ISBBF, ISTBF and ISDBF; and bits 10–13 sense respectively CPTBF, CPSPF, DF and CPCL. |
| | CPAL | Central Processor Activity Level (Central Processor Active Unit Flip-Flop Output). |
| TMC | DCPAL | Diagnostic CP Activity Level — When false, inhibits the repetition Rate Error Indication Flip-Flop (RREIF) from becoming set in the standby CP. |

In addition to the four bus control flip-flops this group also contains combinatorial logic circuitry 106 that encode the outputs of the above flip-flops 105 into four bus control levels. These levels enable the activation of the instruction store bus system interface circuits in the IOC that correspond to the configuration specified by the bus control flip-flops. The four bus control levels (which are transmitted to IOC 24) are:

1. Send Instruction Store Bus ϕ Level (SISBϕL).
2. Send Instruction Store Bus 1 Level (SISB1L).
3. Receive Instruction Store Bus ϕ Level (RISBϕL).

4. Receive Instruction Store Bus 1 Level (RISB1L).

The ISCBF, ISBBF and ISTBF flip-flops are of the Dual Rank type seen in FIG. 22 and become set or reset in TϕAL of the instruction cycle following the WMCG or WMCP (set or reset) instruction which means that the instruction following the WMCG or WMCP instruction will be the last one to be executed from the old configuration.

FIG. 23 shows a table of bus control flip-flops configurations. FIG. 24 shows bus control level equations for generating the required configuration signals. FIGS. 25–40 represent the 12 possible IS bus configuration with either CP unit active and the other standby.

Turning now to FIG. 41, the CPAUF flip-flop 100 and its associated circuitry is seen in more detail. As mentioned above, this flip-flop specifies whether the CP in which it resides is the active or the standby copy. The signal CPAL is representative of its associated central processors being the active copy. The flip-flop basically comprises four NOR gates 108, 109, 110 and 111, the first two of which are associated with CP1 and the latter two of which are associated with CPϕ. The two trouble flip-flops CPTBFϕ and CPTBF1 are designated respectively 112 and 113 for the two CPs. Because a portion of the CPAUF flip-flop 100 is located in each CP, the interconnections between output and input are effected by means of cable drivers. That is, the symbol designated 114 is an inverting cable driver, and the symbol designated 115 is a double inverting cable driver.

FIG. 41 also shows the circuit location of the Power Monitor Circuits in each CP copy, see the dashed blocks labeled PMCϕ and PMC1. The function of the PMC has been described above, just before Section III.

FIG. 42 is a table showing the operation in the CPAUF for both switching and non-switching sequences in the active and standby CP copies. For example, the chart to the left half of FIG. 42 illustrates the six signal level changes in switching CP copy ϕ from active to standby. The table to the right-hand portion of FIG. 42 attempts the same switching; however, in this case the trouble flip-flop CPTBF1 designated 113 is set, indicating that copy 1CP cannot assume an active state. The CPAUF therefore reassumes the original status.

V. Input/Output Circuit (IOC)

The Control and Maintenance Complex of the TSPS machine contains four major complexes; Central Processor (CP*), Instruction Store (IS*), Process Store (PS*), and Peripheral Unit (PU*). The CP* requires access to the other complexes; IS* and PS* for instructions and data storage and PU* to control the many functions required to process calls. To accomplish this access the CP* is connected to the IS*, PS*, and PU* via a duplicated system of AC cable drivers, receivers, and buses.

The primary function of the Input/Output Circuit (see 24 of FIG. 1) (IOC) is to provide the interface in the CP* through which the CP* gains access to the external bus system and complexes. The IOC will be disclosed herein only so far as is necessary to understand how reconfiguration of the Information Store and Central Processor copies is accomplished.

The basic functions of the interface between the CP and other complexes are: 1. To identify the complex to use as input or source; 2. To identify the complex to which the source is to transmit; and 3. To determine the timing for transmission. This timing for transmission from source is defined and controlled by the CP*, and the timing for reception is specified by the CP but controlled by the transmitting complex. The functions to be performed are identified by the IOC from the control signal inputs it receives.

Figure 6:
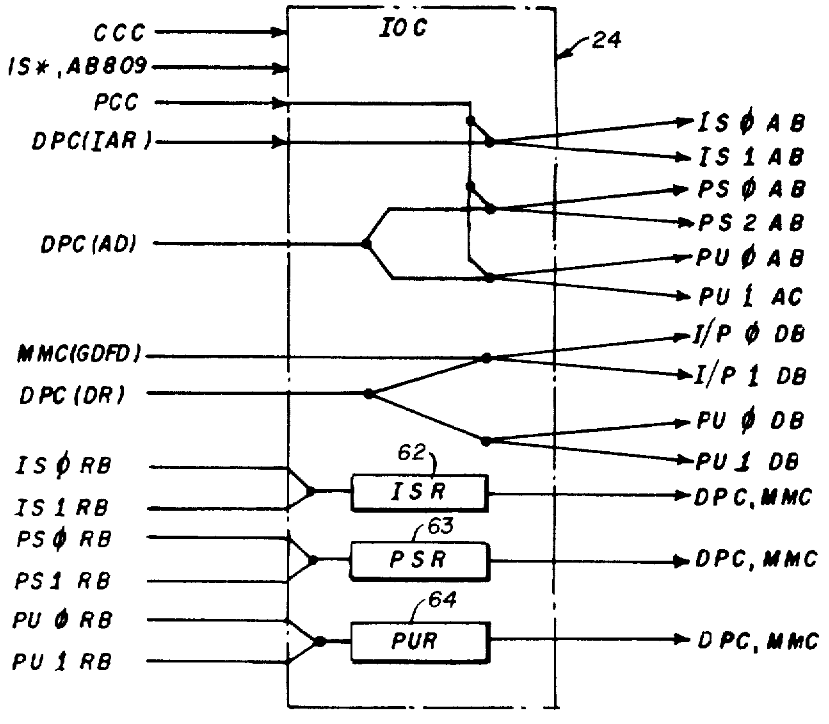
FIG. 6 is a functional block diagram of the Input/Output Circuit of the Central Processor.

Since the sending complex controls the data reception in the IOC, which is due to the IS*, PS* and PU* complexes being asynchronous with respect to the CP*, the secondary function of the IOC is to provide a buffer register for return data from each complex. The inputs and outputs of the IOC are shown in FIG. 6 which also schematically shows the routing of data and the buffer registers: Instruction Store Buffer Register 62, the Process Store Buffer Register 63, and the Peripheral Unit Buffer Register 64, also respectively denoted ISR, PSR and PUR.

Communication channels and subsystems are identified using the following nomenclature and format. The format consists of up to eight alpha numeric characters in the format below and with the following information:

(XXX.XX.XXX)

The three character prefix (first three characters) defines the complex and the copies with the exception of the PU*. Characters one and two identify the subsystem CP, IS, PS, PU, IP (signifies Instruction Store and Process Store subsystems), or the Peripheral Control ($\bar{P}$C) of the PU complex.

* — Complex, the collection of all units defined by the subsystem or PC identifier.

1 — Copy 1 of the complex.

ϕ — Copy ϕ of the complex.

The component characters (characters four and five) specify the bus:

BS — The Bus System.

AB — The Address Bus.

DB — The Data Bus.

RB — The Return Bus.

The last three suffix bits refer to one of "*n*" bits on a bus. The notation is of the following form:

.BXX — The bit specified, where XX could range from ϕϕ to 33.

Organization of the IOC (see FIGS. 159 and 160 which are functional block diagrams)

In general, the IOC 24 is organized into three sections. They are: CP*-IS* communications; CP*-PS* communications; CP*-PU* communications. Each section contains: AC cable drivers and receivers required for bus system communications; buffer register, composed of set-reset flip-flops, for retaining data received from the bus system; and combinatorial logic circuitry for channeling the address and data words onto, or the data word from the appropriate bus(es) of the system.

The bus systems include: 1) the IS* bus system which includes the IS* Address Bus 120, IS* Return Bus 121 and the IP* Data Bus 122 which is shared with the PS*; 2) the PS* Bus system which includes the IP* Data Bus 122, just mentioned, the PS* Address Bus 123, and the PS* Return Bus 124; and 3) the PC* Bus system which includes the PC* Address Bus 125, the PC* Return Bus 126 and the PC* Data Bus 127. It will be observed that whereas the PC* has a separate Data Bus, the IS* and PS* share one.

CP*-IS* Communications

See FIGS. 169–171 of the above-identified Brenski, et al. application Ser. No. 289,718 for word formats on the communication buses.

This section executes the channeling of:

*a.* The 23 bit IS address word onto one or both of the IS (ϕ or 1) Address Bus(es), namely bits 9 through 31 (IS*.AB.Bϕ9–B31).

*b.* The 33 bit IS data word onto one or both of the IS & PS (called IP) (ϕ or 1) Data Bus(es), bits ϕ through 32 (IP*.DB.Bϕϕ–B32).

*c.* The 34 bit IS data word from one or both of the IS (ϕ or 1) Return Bus(es), bits ϕ through 33 (IS*.RB.Bϕϕ–B33) into the Instruction Store Register (ISR), to be described presently.

The IOC circuits for each copy of CP are similar, and only one need be described in further detail for a complete understanding of the invention.

ISϕIF and IS1IF Operation (see FIG. 44)

The Instruction Store ϕ Inhibit Flip-Flop, denoted 130, (ISϕIF) and Instruction Store 1 Inhibit Flip-Flop 131 (IS1IF) when set, provide individually controllable inhibits of ISϕ.AB and IS1.AB for diagnostics. These flip-flops can be sensed via MAC and can also be set or reset as follows:

| | |
|---|---|
| Active CP | |
| Set: | via MAC only. |
| Reset: | hardware interrupt occurence or |
| : | after manual switch of CP's, or |
| : | via MAC. |
| Standby CP | |
| Set: | via MAC, or |
| : | after manual switch of CP's. |
| Reset: | via MAC only. |

FIG. 45 shows the IOC gating for selecting the IP* Data Bus 122.

Instruction Store Register (ISR) Operation

As shown in FIG. 46, the ISR 133 loads a received IS* unit word upon the All Seems Well Level (IS*.RB.B33) becoming true and provided the Instruction Store Register Enable Flip-Flop 134 (ISREF) is set. ISREF isolates the ISR from the IS*.RB between the start of TϕAL and the start of T5AL.

The ISR must be reset prior to receiving an IS* unit word. The "DO" command generated by the active CP* is coupled from the IS*.AB.Bϕ9 and used for ISR reset in both CP's. This insures the ISR of the stopped standby CP* will never contain more than one IS* unit word so that when the standby CP* is started in sync with the active CP*, correct match operation or instruction execution can be expected.

ISREF Operation

The ISREF flip-flop 134 is primarily an ISR enable flip-flop which when set (by T5AL, the timing interval immediately following the transmission of the IS address word) permits the return data word from an IS* unit to be accepted into the ISR upon recognizing the "all seems well" level becoming true ("all seems well" must be received 100 ns before the end of T7PL). The in TϕAL the ISREF is reset which inhibits the ISR from accepting erroneous IS*.RB information. (Noise occurring on the IS*.RB between T7PL and T5PL could have possibly altered the ISR contents).

The ISREF can be sensed and reset via MAC for diagnostic purposes, as shown.

VI. COMMUNICATIONS WITH INSTRUCTION STORE

The Instruction Store complex IS* (19 of FIG. 1) consists of two identical copies ISϕ and IS1 (denoted 36 and 37 in FIG. 2A).

Each copy contains up to eight units (numbered ϕ through 7). Each Instruction Store unit is identified by its copy number and unit member.

Example: ISϕ.U3 = Copy ϕ of IS Unit 3

The capacity of an IS Unit is 16,384 words of 33 bits (32 data, 1 for odd parity).

The Instruction Store complex is composed of two types of store units. One unit of each copy is a random access read only unit. All others are 16,384 word read-write random access units. The read only unit is always defined to be Unit ϕ of each copy.

Referring to FIG. 47, the following parts of an IS Unit will be discussed:

*a.* Address Register (AR) is a 22 bit register divided as follows:

| | |
|---|---|
| Unit Address | 3 bits |
| Word Address | 14 bits |
| Commands | 5 bits |

An IS Unit accepts an address in AR on receipt of the DO signal from CP. (This means that all units on a bus accept addresses simultaneously).

*b*. Decode Logic is a straightforward combinational logic network which performs the following functions:

decodes Unit Address. Receives Unit Address is compared with unit number (hard-wired in each unit during installation). Unit proceeds with operation only if these numbers are equal.

decodes commands and performs required operations.

decodes word address for operations involving memory bank.

*c*. Data Register (DR) is a 33-bit register which:

accepts data from CP (write operation).

accepts data from memory bank (read operation).

*d*. Status Flip-Flops

These flip-flops modify the reaction of the Unit to commands from CP. The following FF's are included:

WDF: Write-Disable FF (denoted 142)

When WDF = 1, unit ignores normal "write" commands.

Note: The read-only unit (Unit φ) does not have a WDF.

TBF: Trouble FF (denoted 141)

When TBF = 1, unit ignores all "normal" commands.

TDF: Transmit Disable FF (denoted 143)

When TDF = 1, unit performs all memory operations but no information is transmitted over bus.

ARF: Address Register Flip-Flop 140, described further below.

Instruction Store Bus System

The Instruction Store Bus System IS*.BS (FIG. 2A) includes two identical copies: ISφ.BS and IS1.BS.

ISφ.BS connects both CP's with the units of ISφ.

IS1.BS connects both CP's with the units of IS1.

IS*.BS can be divided into three buses:

| | | |
|---|---|---|
| IS*.AB | Address Bus | 23 bits (22 address bits, DO). |
| IP*.DB | Data Bus | 33 bits (32 data, 1 odd parity). |
| IS*.RB | Return Bus | 34 bits (32 data, parity, ASW). |

The data buses IP*.DB are shared by PS* and IS*. In other words, these buses can be considered as part of both PS&.BS and IS&.BS.

Interface CP*-IS*.BS

In each CP, the input-output circuit IOC contains the AC cable drivers CD, the AC cable receivers CR and the buffer-register (ISR) for IS return data that form the interface with IS*.BS, as shown in FIG. 48.

CD1 is group of 23 drivers to outpulse address and "DO" to ISφ.

CD2 is group of 33 drivers to outpulse data + parity to PSφ and ISφ.

CD3 is group of 23 drivers to outpulse address and "DO" to IS1.

CD4 is group of 33 drivers to outpulse data + parity to PS1 and IS1.

CR1 is group of 34 receivers to receive return data from ISφ.

CR2 is group of 34 receivers to receive return data from IS1.

CR3 is used to receive the "DO" signal from ISφ.AB to reset ISR.

CR4 is used to receive the "DO" signal from IS1.AB to reset ISR.

In each CP, individual groups of CD and CR can be enabled or disabled. This determines the CP*-IS* configuration.

Example: If CP1 is to transmit to ISφ, then CD1 and CD2 are enabled. Only one CP is allowed to transmit on a bus, therefore CD1 and CD2 in CPφ should be disabled.

Example: If CP1 is to receive from ISφ, then only CR1 and CR3 have access to its buffer register ISR. In this situation CPφ may or may not also receive from ISφ, so we cannot say anything about its CR1 and CR3.

Interface IS(CN).BS – IS(CN).UN

The suffix (CN) is used when a statement or a drawing applies equally to copy φ and to copy 1.

Each IS Unit contains two groups of AC cable receivers and one group of AC cable drivers, as shown in FIG. 49.

CR1 is group of 23 receivers to receive address and "DO" from IS(CN).AB.

CR2 is group of 33 receivers to receive data + parity from IP(CN).DB.

CD1 is group of 34 drivers to outpulse return data on IS(CN).RB.

NOTE: Both IS(CN).Uφ contain one additional AC cable receiver CR3 connected to RCB.Bφ6. CR3 receives a signal (R1CCL) used to reset the trouble FF(TBF) of both IS(CN).Uφ.

Interface CP*.RCC-IS*.Uφ

The Recovery Control Circuit Bus (RCB in FIGS. 48 and 49) connects directly to Unit φ of both IS(CN). RCB.Bφ4 which carries the signal R1CCL generated in the Recovery Control Circuit, as shown in FIG. 13, is used to reset the trouble FF (TBF 141 in FIG. 47) and transmit disable FF (TDF 143) in both IS(CN).Uφ.

The memory unit is capable of "read" and "write" operations in the normal and control modes and only read in the special mode. The control and special modes are used only for diagnostic and maintenance testing. "Read" and "write" commands for each mode give six operations, referred to as cycles.

Normal Modes

Read Normal (RN) Cycle

The RN cycle sometimes referred to as a Read/Restore mode, consists of reading (and subsequently restoring) the 33 bit word at core stack location W specified by the address and storing it into the Data Register (DR). The Unit Selected (PS(CN).UN) transmits contents of the DR on the Process Store Return Bus, PS(CN).RB.

Write Normal (WN) Cycle

The WN cycle, sometimes referred to as a clear/write mode, consists of clearing existing data from the addressed unit word and writing into core stack location W the new 33 bit data that was accepted by DR of the addressed PS Unit. The PS(CN).UN transmits address echo on the PS(CN).RB.

Control Modes

Read Control (RC) Cycle

The RC cycle consists of reading non-memory information from specific address dependent points that are internal to the memory unit but not in the memory stack itself. These points assume logical states which may or may not be address dependent since only the three least significant bits of the address field will specify the points to be sensed. Information from the sensed points is gated onto the PS(CN).RB.

Write Control (WC) Cycle

The WC cycle consists of writing information gated from the DB into specific flip-flop points (either special maintenance flip-flops or the data register) determined by the address and which are internal to the memory unit but not in the memory stack itself. This cycle also returns the address echo on the PS(CN).RB.

Special Test Mode

Read Special Test (RST) Cycle

The RST cycle gates information directly to the PS(CN).RB from specific internal address independent points (hard wired into PS(CN).RB gates) whose states are address dependent. The DR and the contents of the core stack are not involved.

Write Special Test (WST) Cycle

The WST places the address echo on the PS(CN).RB. The DR and the contents of the core stack are not involved.

Trouble Flip-Flop (TBF) 141

This flip-flop, when in the set state, does not allow Read Normal or Write Normal operations. This is accomplished by inhibiting the memory clock. The status of the TBF is determined by the Write Control Cycle when PS(CN).AB – MOD 8 = $\bar{5}\cdot\bar{3}$.* TBF sets if IP(CN).DB.B30 was a logical 1 during the cycle and TBF resets if IP(CN).DB.B31 was a logical 1 during the cycle. If IP(CN).DB.B30 and IP(CN).DB.B31 are both logical 1 during the cycle the state of the TBF will be indeterminate, see FIG. 51. The state of TBF cannot be changed while ARF is set.

Transmit Disable Flip (TDF) 143

This flip-flop, when in the set state, allows all memory operations but inhibits the transmission of information on the PS(CN).RB. The electromechanical sense points are activated when the TDF is set. The status of the TDF is determined by the Write Control Cycle when PS(CN).AB – MOD 8 = $\bar{5}\cdot\bar{3}$. This type of Write Control operation always leaves the TDF in the reset state unless the IP(CN).DB.B16 was a logical 1 during the cycle.

Address Register Flip-Flop (ARF 140)

This flip-flop, when in the set state, inhibits the data window strobe as well as the address window strobe for the 14 least significant address bits. This flip-flop will be used for the detection of faults that may occur in the address delay line card as well as the address register card of the memory system that would otherwise go undetected. This flip-flop can be reset with any Write Control Cycle. The ARF flip-flop can be set by a Write Control cycle in the PS(CN).AB – MOD = $\bar{5}\cdot\bar{3}$. The nomenclature PS(CN).AB – MOD 8 = $\bar{5}\cdot\bar{3}$ is used to denote the status of the three least significant bits of the address bus. In the case where MOD 8 = $\bar{5}\cdot\bar{3}$, the octal equivalent of the three least significant bits can be $\phi$, 1, 2, 4, 6 or 7.

Write Disable Flip-Flop (WDF) 142

This flip-flop, when in the set state, does not allow Write Normal operations. This will be accomplished by inhibiting the memory clock. The status of the WDF is determined by a Write Control Cycle when IS(CN).AB – MOD 8 = $\bar{5}\cdot\bar{3}$. This type of Write Control operation always leaves the WDF in the reset state unless the IP(CN).DB.B28 was a logical 1 during the cycle.

Write Control

This operation controls the states of the maintenance flip-flops described above as well as the flip-flops of the memory data register (DR). The following gives a detailed description of the operation in terms of the operational pulse, mode pulse, and address necessary to perform the operation:

Operational Pulse — Write (W)

PS(CN).AB — Mod 8 = 5 (see FIG. 50)

Unit Select PS(CN).UN = 1

A. Returns Address Echo

B. Places data of IP(CN).DB into memory data registers

C. ASW = 1

D. TBF = X

E. TDF = 0

F. ARF = 0

G. WDF = X

H. AVF = X

I. BVF = X

PS(CN).AB — Mod 8 = $\bar{5}\cdot\bar{3}$ (FIG. 51)

Unit Select PS(CN).UN = 1

A. Returns Address echo

B. Controls states of the maintenance flip-flops through the IP(CN).DB

C. ASW = 1

D. TBF = X (will reset unless IP(CN).DB.B30 = 1)

E. TDF = X (will reset unless IP(CN).DB.B16 = 1)

F. ARF = X

G. WDF = X (will reset unless IP(CN).DB.B28 = 1)

H. AVF = X

I. BVF = X

Figure 5:
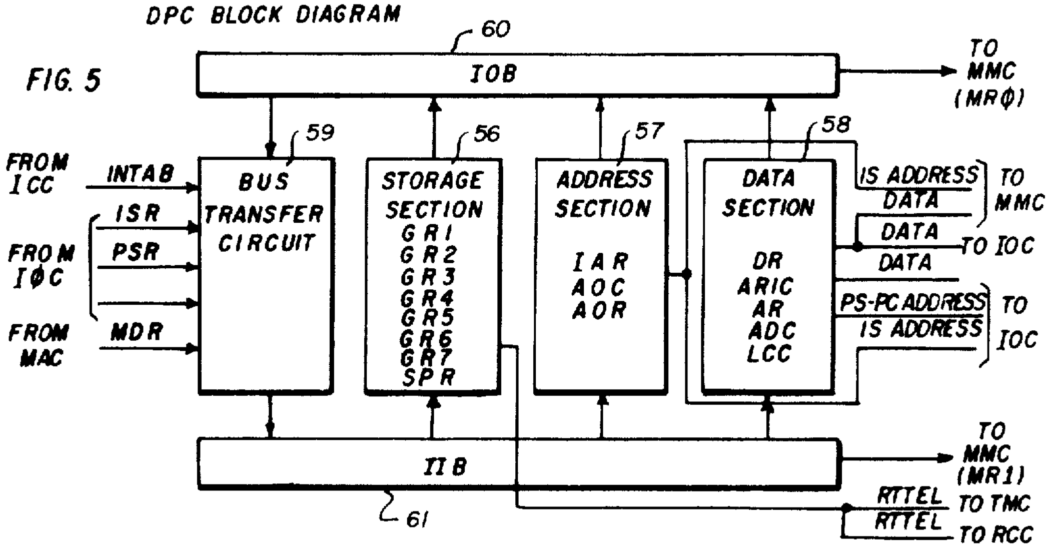
FIG. 5 is a functional block diagram of the Data Processing Circuit of the Central Processor.

PS(CN).AB — MOD 8 = 3 See FIG. 5.F.1

Unit Select PS(CN).UN = 1

A. Returns Address echo

B. Ignores data of IP(CN).DB

C. Resets ARF if IP(CN).DB.B21 = 1

We claim:

1. A data processor having first and second processing circuits, first and second signal storage means, and maintenance circuits, said maintenance circuits sensing conditions within said processor to generate error signals upon the detection of faults, said processing circuits and said storage means being adapted to be reconfigured to provide different operative combinations;

wherein the improvement comprises: recovery control circuit means including control circuit means responsive to said error signals for generating a start level signal;

a timing generator circuit responsive to said start level signal for generating sequential timing signals, a predetermined number of said timing signals defining a timing cycle, one of said timing signals for each timing cycle being a state change signal;

said control circuit means including means receiving said timing signals for generating a system recovery signal in response to said error signals; and state control circuit means responsive to said system recovery signal and including a sequential count circuit for defining permissible configuration states of said processing circuits and signal storage means, said state control circuit means including means for storing signals representative of the instant configuration for determining the next permissible configuration state, said state control circuit further including means for generating an advance state signal and transmitting the same to said control circuit means to actuate said control circuit during predetermined state changes;

said control circuit means further including means responsive to said error signals and said advance state signal for generating reconfiguration signals defining a new predetermined configuration of said processing circuits and storage means.

2. The apparatus of claim 1 wherein said state control circuit is a non-programmable circuit and wherein said signals representative of the instant configuration define four permissible configuration states for said system, S$\phi$, S1, S2 and S3 respectively; and wherein said error signals comprise primary error signals and secondary error signals, state S$\phi$ being a reset state, and wherein said recovery control circuit is responsive to either of said secondary or primary error levels to assume state S1; said recovery control circuit being responsive only to said primary error signals to assume states S2 and S3, state S2 being representative of one of said storage means being primary and state S3 being representative of the other of said storage means being primary, whereby said state control circuit means is responsive to said error signals, said timing signals, said signals representative of the instant configuration and said advance state signal for generating a processing circuit switch signal in going from state S1 to said state S2 and in going from state S3 to said state S2, and to generate a storage means switch signal in going from state S2 to state S3 and from state S3 to state S2.

3. The apparatus of claim 1 wherein said recovery control circuit means is a first recovery control circuit means and further comprising a second data processor including a second recovery control circuit means, each recovery control circuit means associated with its own processing circuit, and said data processors cooperating such that only one data processor is active at one time, said active data processor including circuit means for generating an activity signal to its associated recovery control circuit indicative of which processor is active, the recovery control circuit means in each processor circuit being dependent upon receipt of an activity signal from its associated processor to generate said timing signals.

4. The apparatus of claim 3 further comprising external recovery circuit bus means communicating said first and second recovery control circuit means and wherein the recovery control circuit means in each data processor also includes bus control circuit means for controlling the state control circuit means in the other recovery control circuit means when its associated data processor is active.

5. The apparatus of claim 4 wherein said state control circuit means further comprises input bistable circuit means having an output signal for advancing said sequential count circuit associated therewith upon the termination of a timing pulse; input control logic circuitry responsive to the presence of timing signals and responsive to signals representative of said signals representative of the instant state of its associated data processor for inhibiting advancement of the state of said input bistable circuit means when the output signals of said output counter circuit means indicate that said recovery control circuit means is not in a state from which it should advance.

6. A data processing system having first and second central data processors each including processing circuits and maintenance circuits, and first and second storage means, said maintenance circuits sensing conditions within said system to generate error signals upon the detection of faults therein, said first and second central data processors and said first and second storage means being adapted to form different operative configurations including an active central data processor with a primary storage means, and a standby central data processor with a secondary storage means;

wherein the improvements comprise:

recovery control circuit means in each central data processor, each recovery control circuit means being responsive to its associated central data processor such that only the recovery control circuit in the active central data processor is itself active, each recovery control circuit including control circuit means responsive to said error signals from its associated central data processor for generating a start level signal;

a timing generator circuit responsive to said start level signal for generating sequential timing signals a predetermined number of which define a timing cycle, one of said timing signals of each timing cycle being a state change signal; and state control circuit means responsive to said state change signal and including a sequential count circuit for defining permissible re-configuration states of said first and second central data processor and said first and second storage means, said state control circuit means further including means for instant configuration signals representative of the instant configuration, said state control circuit further including means for generating an advance state signal and transmitting the same to said control circuit means;

said state control circuit means being further responsive to said error signals and said advance state signal for generating signals for forming a new predetermined configuration of one of said central data processors and one of said instruction storage means; and conductive bus means coupling together said recovery control circuit means of said first and second central data processors, whereby the recovery control circuit means of the active central data processor will control the state control circuit means of the recovery control circuit means of the standby central data processor.

7. The apparatus of claim 6 wherein said error signals include primary error signals and secondary error signals and wherein said state control circuit means of said recovery control circuit means includes means responsive to both said secondary error levels and said primary error levels for advancing its associated state control circuit from a first state S$\phi$, to a second state S1, and, in response to said state control circuit means' being in said S1 state, to generate said system recovery signal only when said state change is caused by a primary error signal.

8. The apparatus of claim 6 wherein said state control circuit means further comprises circuit means responsive to a primary error signal only when in said S1 state for changing to state S2 and for generating a processor switch signal when changing from said state S1 to said state S2.

9. The apparatus of claim 6 wherein each state control circuit means comprises: a configuration control bistable circuit; a plurality of memory bistable circuits providing said sequential count circuit generating said signals representative of the instant state of its associated data processor; and wherein said input logic circuit means is responsive to said signals representative of the instant state of said data processor for advancing the state of said configuration control bistable circuit only when said counter circuit is permitted to so advance as determined by the instant state of said counter circuit; and second logic circuit means responsive to said signals representative of the instant state of said data processor for advancing the state of said sequential count circuit in response to a subsequent timing signal and to the instant state signals of said configuration control bistable circuit.

10. The apparatus of claim 7 wherein said state control circuit means further comprises circuit means responsive only to a primary error signal to change from said state S2 to a state S3 and further includes means for generating a signal to identify a predetermined one of said storage means as the primary storage means, said state control circuit being responsive to a subsequent primary error level to change back to said state S2 and to generate signals for changing the status of both central data processors and both storage means.

11. The apparatus of claim 10 wherein said system further comprises a recovery program timer in each of said central data processors responsive to said timing signals and initiated by one of said switch signals for timing recovery programs and wherein each of said recovery control circuit means is resettable from any of said S1, S2 and S3 states under program control and in response to a signal representative of said recovery program timer circuit's generating a signal that a recovery program has been finished within a predetermined time.

12. The apparatus of claim 11 further comprising program-controlled circuit means for resetting said recovery program timer under program control.

13. The apparatus of claim 12 wherein each of said data processors further comprise maintenance access circuit means for setting the state of said configuration control bistable circuit and said counter circuit under program control.

14. The system of claim 13 wherein each of said data processors further comprise maintenance access circuit means for sensing the state of said configuration control bistable circuit and said plurality of memory bistable circuits forming said counter circuit, said maintenance access circuit means being program controlled.

15. A state control circuit for defining the permissible configurations of first and second central data processors and first and second storage means such that one central data processor is active and associated with one storage means which is primary, and the other central data processor is inactive and associated with the other storage means which is secondary, each of said central data processors having an associated state control circuit, comprising:

a configuration control bistable circuit;

a plurality of memory bistable circuits arranged as a counter circuit for generating output signals defining the states of permissible configurations of said data processors and storage means;

input logic circuit means responsive to the output signals of said counter circuit and a first timing signal for advancing the state of said configuration control bistable circuit only when said counter circuit is permitted to so advance as determined by the instant state of said counter circuit; and second logic circuit means responsive to said output signals of said control bistable circuit for advancing the state of said counter circuit in response to a subsequent timing signal.

16. The apparatus of claim 15 further comprising a second state control circuit and first and second alternating-current-coupled buses interconnecting the input logic circuit means of each of said state control circuits, said input logic circuit means further including a first gate responsive to said output signals of said counter circuit for feeding one of said alternating-current-coupled buses, said bus being coupled to a set side of said configuration control bistable circuit; said input logic circuit means further comprising a second gate responsive to said counter circuit's being in predetermined states and coupling to the other of said alternating-current-coupled buses for feeding the reset side of said configuration control bistable circuits in each of said state control circuits.

* * * * *

UNITED STATES PATENT OFFICE
CERTIFICATE OF CORRECTION

Patent No. 3,835,312 Dated Sept. 10, 1974

Inventor(s) JOHN A. WILBER, VERNER K. RICE, ROLFE E. BUHRKE

It is certified that error appears in the above-identified patent and that said Letters Patent are hereby corrected as shown below:

Title page [75], add --DONALD L. SCHULTE, OAK PARK, ILLINOIS --

Signed and sealed this 3rd day of December 1974.

(SEAL)
Attest:

McCOY M. GIBSON JR.
Attesting Officer

C. MARSHALL DANN
Commissioner of Patents

Disclaimer 3,835,312.—*John A. Wilber*, Elk Grove Village, *Verner K. Rice*, Wheaton, *Rolfe E. Buhrke*, La Grange Park, and *Donald L. Schulte*, Oak Park, Ill. RECOVERY CONTROL CIRCUIT FOR CENTRAL PROCESSOR OF DIGITAL COMMUNICATION SYSTEM. Patent dated Sept. 10, 1974. Disclaimer filed Mar. 17, 1975, by the assignee, *GTE Automatic Electric Laboratories Incorporated.*

Hereby enters this disclaimer to claims 1, 3, 4, 6, 8 and 15 of said patent.

[*Official Gazette May 20, 1975.*]